(12) United States Patent
Pietrowicz et al.

(10) Patent No.: US 9,667,521 B2
(45) Date of Patent: May 30, 2017

(54) SYSTEM AND METHOD FOR NETWORK TRAFFIC PROFILING AND VISUALIZATION

(71) Applicant: Vencore Labs, Inc., Basking Ridge, NJ (US)

(72) Inventors: Stanley Pietrowicz, Basking Ridge, NJ (US); Michael M. Hylkema, Basking Ridge, NJ (US); Paul D. Martin, Basking Ridge, NJ (US); Jason Youzwak, Basking Ridge, NJ (US); Aditya Naidu, Basking Ridge, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 156 days.

(21) Appl. No.: 14/606,621

(22) Filed: Jan. 27, 2015

(65) Prior Publication Data

US 2015/0215177 A1    Jul. 30, 2015

Related U.S. Application Data

(60) Provisional application No. 61/931,951, filed on Jan. 27, 2014.

(51) Int. Cl.
*H04L 12/26* (2006.01)
*H04W 24/10* (2009.01)
(Continued)

(52) U.S. Cl.
CPC ......... *H04L 43/106* (2013.01); *H04W 24/10* (2013.01); *H04L 41/145* (2013.01); *H04L 43/045* (2013.01); *H04L 43/12* (2013.01); *H04W 24/02* (2013.01)

(58) Field of Classification Search
CPC ..... H04L 43/12; H04L 63/1416; H04L 43/04; H04L 43/16; H04L 63/1408; H04L 41/12;
(Continued)

(56) References Cited

U.S. PATENT DOCUMENTS

| | | | |
|---|---|---|---|
| 6,282,546 B1 | 8/2001 | Gleichauf et al. | |
| 6,785,237 B1 * | 8/2004 | Sufleta | H04L 43/12 370/236 |

(Continued)

FOREIGN PATENT DOCUMENTS

| | | |
|---|---|---|
| WO | WO 2006022594 | 3/2006 |
| WO | WO 2011156914 | 12/2011 |

OTHER PUBLICATIONS

International Application No. PCT/US2015/013051, International Search Report and Written Opinion, mailing date Jun. 10, 2015.
(Continued)

*Primary Examiner* — Michael J Moore, Jr.
(74) *Attorney, Agent, or Firm* — Heslin Rothenberg Farley & Mesiti P.C.

(57) ABSTRACT

A computer system, computer program product and method of performing traffic analysis on a communications network includes time stamped packets and related metadata from an intercepted steam of real-time traffic on a backhaul network distinct from the communications network, pre-processing the intercepted stream, including separating a portion of the intercepted stream into dissected fields, creating indicators by selecting an analysis operator to apply to one or more of the dissected fields in a logical expression, analyzing the dissected fields in the output streams utilizing the indicators, and obtaining results from the indicators.

18 Claims, 43 Drawing Sheets

(51) Int. Cl.
*H04L 12/24* (2006.01)
*H04W 24/02* (2009.01)

(58) Field of Classification Search
CPC ... H04L 43/062; H04L 43/106; H04L 1/1678; H04L 29/06884; H04W 48/16; H04W 24/08

See application file for complete search history.

(56) References Cited

U.S. PATENT DOCUMENTS

| | | | | |
|---|---|---|---|---|
| 8,438,269 | B1* | 5/2013 | West, III | H04L 43/10 709/208 |
| 2003/0086422 | A1* | 5/2003 | Klinker | H04L 29/06 370/389 |
| 2005/0128988 | A1* | 6/2005 | Simpson | H04W 48/16 370/338 |
| 2006/0077902 | A1* | 4/2006 | Kannan | H04L 43/087 370/250 |
| 2008/0137540 | A1* | 6/2008 | Botvich | H04L 12/2697 370/241 |
| 2008/0147847 | A1* | 6/2008 | Pitkow | H04L 43/0817 709/224 |
| 2008/0228908 | A1 | 9/2008 | Link et al. | |
| 2008/0232269 | A1* | 9/2008 | Tatman | H04L 43/12 370/252 |
| 2009/0271508 | A1* | 10/2009 | Sommers | H04L 43/0829 709/224 |
| 2010/0054128 | A1 | 3/2010 | O'Hern | |
| 2010/0226278 | A1* | 9/2010 | Borsos | H04L 43/028 370/253 |
| 2013/0212439 | A1* | 8/2013 | Stevens | H04L 43/12 714/39 |
| 2013/0227689 | A1 | 8/2013 | Pietrowicz et al. | |
| 2013/0315265 | A1* | 11/2013 | Webb, III | H04J 3/0635 370/516 |

OTHER PUBLICATIONS

European Application No. EP 13748518, Supplementary European Search Report, dated Jul. 13, 2015.

\* cited by examiner

```
[Global]
loglevel = 1
logdir = /tmp
flowlabel = Region_1

[InputStream]
inputtype = TCP
inputsource = ACS2:8013
inputtimeout = 100

[StreamAnalyzer1]
analyzertype = Count
analyzertitle = Number of DNS Requests
analyzerselector = dns.flags.response
analyzerexpectedvalue = 0
analyzerfrequency = 600
analyzercharttype = ColumnChart

[StreamAnalyzer2]
analyzertype = Count
analyzertitle = Number of DNS Responses
analyzerselector = dns.flags.response
analyzerexpectedvalue = 1
analyzerfrequency = 600
analyzercharttype = ColumnChart

[OutputStream1]
outputtype =WEB
outputdest = localhost:5007

[OutputStream2]
outputtype = SQL
outputdest = localhost:root:sa:TrafficProfiler
```

FIG. 10

```
[StreamAnalyzer10]
analyzergroup = DA
analyzertype = Count
analyzertitle = DA Management and DNS Traffic (Packets)
analyzercustomargs = Packets
analyzerblurb = This charts shows a count of DA Management packets
seen during the last sampling period.
analyzerfields = analyzerfield1 || analyzerfield2 || analyzerfield3
analyzerfield1 = ipv6.addr
analyzerfield1operator = ==
analyzerfield1value = fdxx:xxxx:xxxx:xxxx:xxxx:xxxx:xxxx:xxxx
analyzerfield2 = ipv6.addr
analyzerfield2operator = regex
analyzerfield2value = fdxx:xxxx:xxxx:.*
analyzerfield3 = ip.addr
analyzerfield3operator = ==
analyzerfield3value = xxx.xxx.xxx.xxx
```

FIG. 26

SYSTEM AND METHOD FOR NETWORK TRAFFIC PROFILING AND VISUALIZATION

CROSS REFERENCE TO RELATED APPLICATIONS

The present invention claims priority from U.S. provisional patent application No. 61/931,951, filed Jan. 27, 2014, and is related to PCT Patent Application No. PCT/US15/13051, entitled "SYSTEM AND METHOD FOR NETWORK TRAFFIC PROFILING AND VISUALIZATION," co-filed herewith on Jan. 27, 2015, which are hereby incorporated herein by reference in their entirety.

FIELD OF INVENTION

The Invention relates generally to systems and methods for profiling network traffic on field area networks.

BACKGROUND OF INVENTION

A Smart Grid is a modernized electrical grid that uses analogue or digital information and communications technology to gather and act on information, such as information about the behaviors of suppliers, consumers, and equipment in the generation, transmission, and distribution networks, in an automated fashion to improve the efficiency, reliability, economics, and sustainability of the production and distribution of electricity. As the grid and its operations become more automated, there is greater dependence on a secure and reliable network to support real-time communications between backend control systems and field nodes and among field nodes. Monitoring the state and health of the network and its components are essential. Monitoring SmartGrid networks presents new challenges that are not present when monitoring more traditional networks.

Smart Grid networks cannot be monitored using existing enterprise network monitoring solutions because field networks use a widely distributed wireless network, a combination of non-standard and energy-specific protocols, and new forms of networking technology not supported in enterprise or carrier environments. For instance, enterprise solutions designed to monitor Internet protocol (IP) traffic cannot process the proprietary packets transmitted over the air in the field. They do not understand the mesh networking technology that enables packet relaying, the unique and asymmetric routing protocols, the peer-to-peer transport mechanisms and the broadcast technologies used in today's Advanced Meter Infrastructure (AMI) networks. Wireless FANs further contain a large number of radio channels with concurrent communications, where nodes hop in both frequency and time, making it difficult for traditional systems to track the full communications of a node. Whereas traditional enterprise monitoring systems are located at a central point in the infrastructure, typically a point between the external internet and the internal network, there is no equivalent point in many Smart Grid field area networks (FANs). Only select traffic, for instance, gets sent back through a central point to management systems. The bulk of the traffic in the FAN is not visible to backend systems. Smart Grid field area networks are also much larger than the largest enterprise networks. A Smart Grid AMI network may contain 5 million nodes, whereas the largest enterprise networks contain one to two orders of magnitude fewer devices.

In addition, the real-time nature of utility control systems requires that any monitoring system does not affect or interfere with the performance of the control network or endpoint, i.e., The monitoring system must be non-intrusive. The process of requesting millions of endpoints to provide status information on a frequent basis and backhauling responses or packet intercepts over the same network which would typically be done in an enterprise environment is not practical as it would create immense traffic congestion on low bit-rate wireless networks and burden the endpoint with additional processing, thereby greatly inhibiting energy operations.

Due to these limitations, utilities that have deployed AMI and Distribution Automation (DA) networks in recent years have almost no visibility into the operation of their wireless mesh networks. A utility's ability to monitor field networks typically stops at access points and collectors, leaving utilities unable to directly monitor wireless field communications among nodes in a field network. At best, current practice relies on limited disjoint information obtained by querying a few individual wireless nodes for network statistics. This practice is not scalable nor does it provide a real-time network view. Nodes cannot be queried continuously in-band because the traffic would create network congestion. Even AMI and DA vendors who offer network management services are not able to directly monitor the mesh as part of their service.

SUMMARY OF INVENTION

Embodiments of the present invention include a computer system, method, and computer program product that perform traffic analysis, including but not limited to, arbitrary real-time network traffic analysis and multi-indicator visualization, with specific applications to wireless mesh networks and Smart Grid traffic by utilizing a distributable, scalable adaptive real-time system. Although embodiments of the present invention have specific applications to wireless mesh networks and Smart Grid, one of skill in the art will recognize that they are also adaptable to different network environments.

In a further aspect of the invention, an embodiment of the present technique consumes and processes multiple streams of real-time wireless mesh traffic intercepts from multi-channel field probes using a parallel architecture to create sets of real-time indicators, including but not limited to, indicators for network health, security, revenue protection, privacy and configuration validation.

In a further aspect of the invention, an embodiment of the present technique provides insightful results using traffic analysis techniques by processing non-standard protocol elements and encrypted traffic.

In a further aspect of the invention, an embodiment of the present technique monitors network traffic by tapping into field in live traffic feeds destined to be processed by an intrusion detection system and allows filtering of fields already defined by a packet dissector to be used as components of a network health indicator. In embodiments of the present invention, the system and method combines multiple fields from an intrusion detection system and a packet dissector into complex indicators, either from the same probe or multiple probes.

In a further aspect of the present invention, an embodiment of the present technique utilizes indicators or traffic from multiple probes to create multi-level views, including but not limited to, a global network view (i.e., all probes), a service area view (i.e., a series of probes within a service area), an Access Point view (i.e., a probe near a specific access point) and a specified node (e.g., a meter). In this embodiment, the multiple levels of monitoring enable system operations to establish quickly the state of their wireless field area network at any instant and drill-down to isolate network health, security, revenue, privacy and configuration issues to a service area, an access point subnet, and even to a particular node.

In a further aspect of the present invention, an embodiment of the present technique utilizes an out-of-band transport channel to collect traffic and metadata to avoid creating congestion on bandwidth constrained, mesh-based field area networks.

In a further aspect of the present invention, an embodiment of the present technique applies timestamps to each packet, and/or utilizes timestamps applied by a packet interceptor, during intercept, in order to faithfully reproduce the actual timeline, negating the effects of delays in backhaul connectivity, differential delay in packet streams from multiple probes and temporary backhaul connectivity loss that would cause the flow in traffic streams being processed by this technique not to match the actual traffic flow in the network being monitored.

In a further aspect of the present invention, an embodiment of the present technique processes live data feeds taken from one or more traffic probes, including but not limited to, both passive and active traffic probes, in Smart Grid field area networks in real-time and maintains the original packet timeline.

In a further aspect of the present invention, an embodiment of the present technique processes live data feeds from a traditional network monitoring point near-end systems to monitor backend Smart Grid traffic in real-time.

In a further aspect of the present invention, an embodiment of the present technique selects predefined fields from packets to create a set of simple or compound indicators with multi-level views across the network.

In a further aspect of the present invention, an embodiment of the present technique performs detailed and flexible analyses on traffic flows in order to compute aggregate statistics to assess performance and network health.

In a further aspect of the present invention, an embodiment of the present technique enables each indicator to operate on its own independent timescale for fast and slow responsiveness.

In a further aspect of the present invention, an embodiment of the present technique enables indicators to be distributed across multiple processors in a server, multiple servers, and multiple processors/servers for intensive individual indicators with the results combined to create an integrated dashboard.

In a further aspect of the present invention each indicator can be configured to operate on its own independent timescale for fast and slow responsiveness to changes in traffic patterns.

In a further aspect of the present invention, an embodiment of the present technique visualizes and monitors the indicators through a web-based dashboard where each instance can use its own choice of graphing presentation for the same data. Each user has the ability to select indicators of interest and indicator layout which can be saved and reconstituted upon future access.

In a further aspect of the present invention, an embodiment of the present technique utilizes indicator graphs to maintain the original intercept timeline and represent data according to that timeline, instead of utilizing a local timeline based on traffic stream flow.

In a further aspect of the present invention, an embodiment of the present technique issues alarms on traffic anomalies and adapts alarm thresholds and alert triggers to changes in traffic flows over time.

In a further aspect of the present invention, an embodiment of the present technique allows a user to playback a packet trace file to recreate the indicators for a past sequence of time.

In a further aspect of the present invention, an embodiment of the present technique supports a database to record historical values for each indicator and allows a user to define a period of time in the past to view for analysis.

In a further aspect of the present invention, an embodiment of the present technique can be scaled to support large traffic volume from a multitude of probes.

BRIEF DESCRIPTION OF DRAWINGS

The foregoing and objects, features, and advantages of one or more aspects of the invention are apparent from the following detailed description taken in conjunction with the accompanying drawings in which:

FIG. 10 is an example of a configuration file utilized in an embodiment of the present invention.

FIG. 26 is an example indicator definition utilized in an aspect of the present invention.

DETAILED DESCRIPTION OF THE INVENTION

Figure 1:
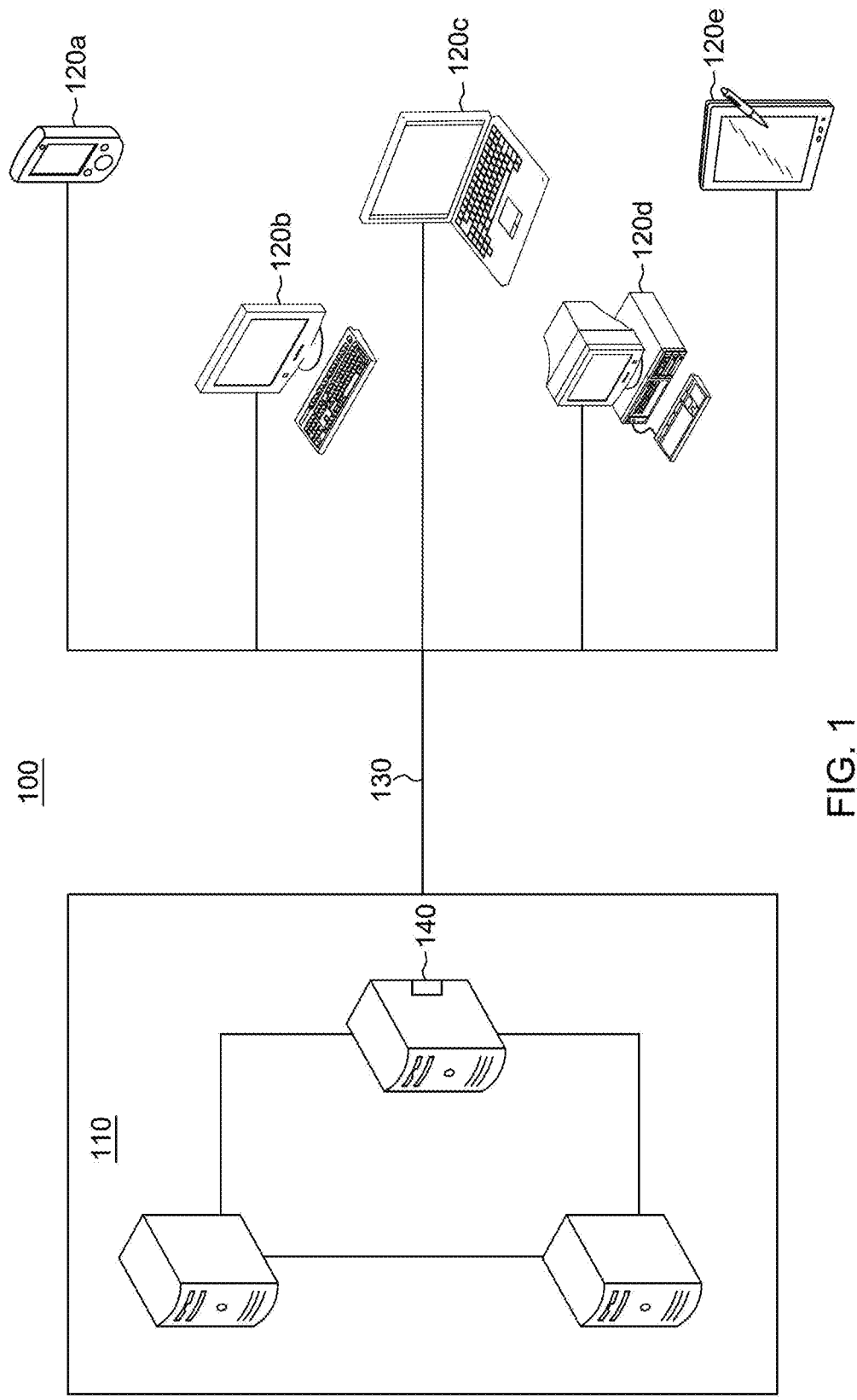
FIG. 1 depicts one example of an aspect a computing environment used to execute one or more aspects of an embodiment of the present invention.

Embodiments of the present invention perform traffic analysis, including but not limited to, arbitrary real-time network traffic analysis, and indicator visualization, including multi-indicator visualization, with specific applications to wireless mesh networks and smart grid traffic by utilizing a distributable, scalable adaptive real-time system. Embodiments of the present invention can be utilized together with the packet acquisition and intrusion detector systems disclosed in U.S. patent application Ser. No. 13/769,133, filed Feb. 15, 2013, entitled "Method and System for Packet Acquisition, Analysis and Intrusion Detection in Field Area Networks," incorporated herein by reference in its entirety. Embodiment of the present invention can also be utilized together with the multi-function electric meter adaptor and methods disclosed in U.S. patent application Ser. No. 13/769,111, filed Feb. 15, 2013, entitled "Multi-Function Electric Meter Adaptor and Method for Use," incorporated herein by reference in its entirety. Embodiments of the present invention can also be utilized with the network analysis and visualization tools disclosed in U.S. patent application Ser. No. 14/163,547, entitled "Method and System for Visualizing and Analyzing a Field Area Network," incorporated herein by reference in its entirety.

Embodiments of the present invention constitute a novel approach to processing, analyzing, visualizing and profiling traffic in field area networks. Monitoring FAN traffic presents several challenges that are not addressed in traditional network monitoring systems. To monitor traffic, network traffic needs is intercepted at multiple locations, over multiple radio channels and processed collectively and individually. In FAN networks, in-band Transport of the traffic and metadata back to a processing center is not feasible given the limited capacity of the service network and need to avoid impacting energy operations. Variable transport delays and intermittent connectivity in the backhaul creates multiple streams that are not synchronized and may occasionally exhibit gaps when connectivity is lost. To address these challenges, embodiments of the present invention reuse processed traffic streams meant for an intrusion detection system, including but not limited to that disclosed in U.S. patent application Ser. No. 13/769,133, which buffers and later uploads traffic when connectivity is restored. Embodiments of the present invention additionally comprise protocol dissectors to monitor proprietary communications, network indicators for network health, security, revenue protection, privacy, and configuration validation, and a scalable processing architecture to handle multiple live streams and process packets for individual indicators on multiple processors and servers. Embodiments of the present invention also utilize packet timestamps applied at intercept instead of local processing time to maintain the original packet timeline. Maintenance of an original packet timeline enables embodiments of the present invention to playback historical traffic traces at an accelerated rate, while maintaining the original timeline in the indicators.

Embodiments of the present invention offer a number of advantages over known network monitoring systems and techniques. Embodiments of the present invention capture, perform analyses on, and report on aspects of traffic traversing a FAN. Embodiments of the present invention utilize independent probes rather than relying on the network nodes themselves to report traffic statistics. Thus, embodiments of the invention do not affect the performance of network nodes and provide independence as a supply chain integrity benefit with the ability for one system to independently monitor another system. In embodiments of the present invention, the capture of packets/traffic does not affect the performance of the mesh network because this traffic is transported out-of-band. Embodiments of the present invention provides real-time network statistics based on live feeds. Embodiments of the present invention integrate with an IDS, including by not limited to, the IDS disclosed in U.S. patent application Ser. No. 13/769,133. such as that disclosed in as these embodiments reuse traffic feeds meant for an IDS. Embodiments of the present invention utilize filterable fields predefined in protocol dissectors and a set of operators to enable users to construct logical expressions for simple, compound and multi-level network indicators across a multitude of probes, while enabling simultaneous display and update of each indicator on independent time scales. Embodiments of the present invention enable the creation of historical baselines, which embodiments of the present invention apply to determine if a given network is operating within control limits. In embodiments of the present invention, indicator timeframes can be configured for short or long durations for fast response to immediate problems and slower response for long term trends. In embodiments of the present invention, these indicators can be updated and changed to help develop a set of orthogonal indicators, i.e., indicators that do not all react to the same problem to help facilitate problem identification. Embodiments of the present invention utilize timestamps to maintain the original packet timeline. Thus, historical views of indicators can be recalled for a defined period and historical packet traces can be played back at an accelerated rate to regenerate network indicators for a historical time period, while maintaining the original timeline.

Embodiments of the present invention enable Smart Meter and Distribution Automation Smart Grid network activity at the lowest levels of communication to be made viewable to network operations, engineering, security, and troubleshooting personnel. Thus, network performance, health and security can be instantly determined from a set of predefined charted indicators with threshold and behavior controls, enabling utility operators to detect Field Area Network problems in a matter of minutes, rather than waiting for the status of a meter read job that is performed every 4 to 6 hours. As aforementioned, historical baselines can be created and applied to determine if the network is operating within control limits. Thus, equipment misconfiguration or failures can be detected and repair teams sent out before impacting power network operations in the case of DA and meter billing in the case of Smart Meters. Thus, security, revenue protection, and privacy are enhanced by quick detection of anomalous activity.

Figure 2:
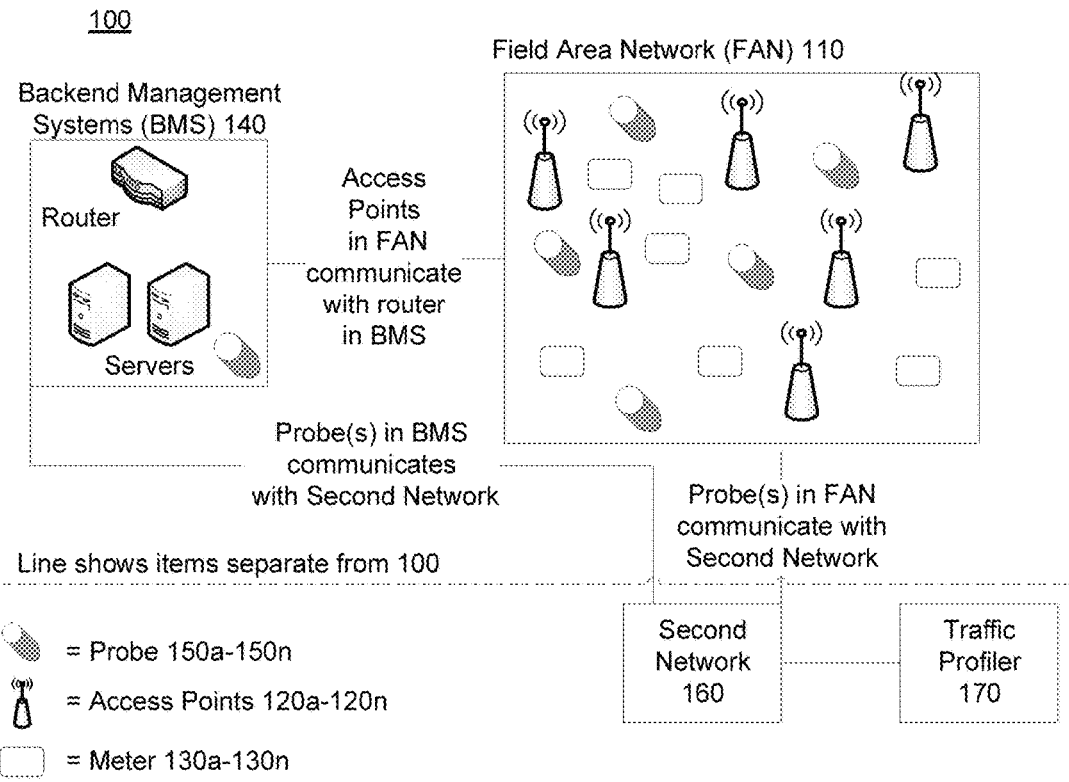
FIGS. 2-3 depict examples of aspects of a Smart energy computing environment.
Figure 3:
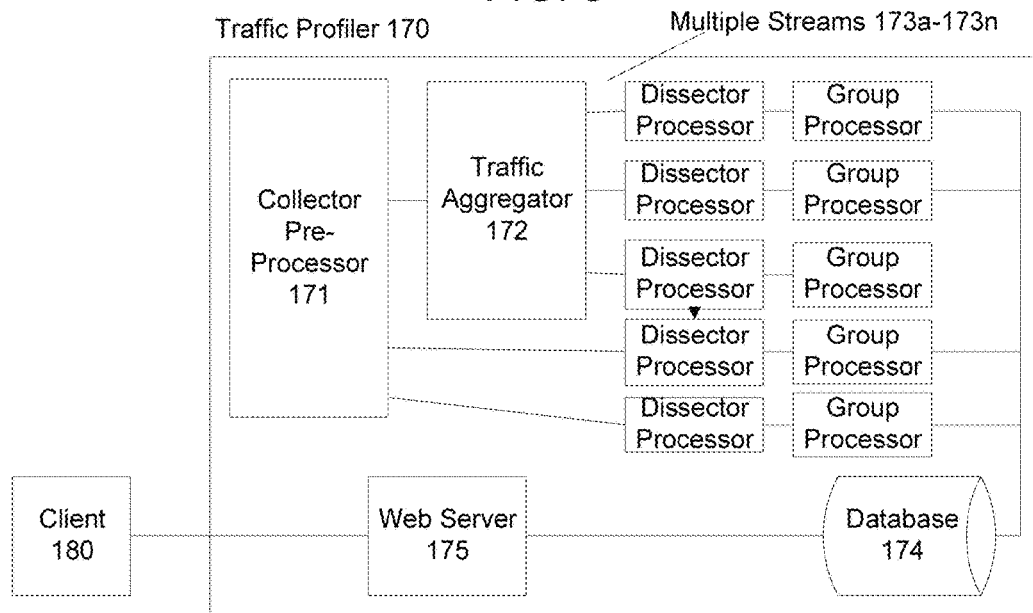

As aforementioned, the techniques of aspects of the invention described herein are specifically applicable to SmartGrid networks because certain aspects are adaptable and enable a user of an embodiment of the invention to overcome challenges that are unique to these types of technical environments. However, aspects of the invention may be applicable in more traditional environments. Thus, FIG. 1 depicts a more traditional computing environment in which aspects of the present invention are applicable. Meanwhile, FIGS. 2-3 depict more specialized aspects of technical environments in which embodiments of the present invention are especially applicable and necessary in order to achieve the traffic profiling described herein.

FIG. 1 is a computing environment 100 used to execute one or more aspects of an embodiment of the present invention. In this embodiment, a computer system 110, which can include a cloud and/or an enterprise system, is accessible by one or more terminals 120a-120e. Computer system 110 can also be a single computer resource. The terminals access the one or more resources of the computer system 110 via a network connection 130, including but not limited to a LAN, a WLAN, and/or an Internet connection.

In this embodiment, computer system 110 contains one or more servers, such as web or application servers, that serve content to the terminals 120a-120e over the network connection 130.

In this embodiment, each of the terminals 120a-120e includes at least one processor (not pictured) and at least one memory resource (not pictured). The terminals 120a-120e are capable of executing a client program on the terminals 120a-120e, including but not limited to a thin client, proprietary client, or a web browser, which users of the terminals 120a-10e utilize to interact with a client application 140 executed on one or more resources of the computer system 110. In this embodiment, the client application 140, which is comprised of computer readable program code, is depicted as residing on one of the resources of the computer system 110. The terms "computer readable program code" and software are used interchangeably and both refer to logic executed by processing circuits on computer resources.

In further embodiments of the present invention, the client application 140 is installed on one or more resources of the computer system 110 and/or one or more computer resources accessible to one or more resources of the computer system 110. In a further embodiment of the present invention, the client application 140 is web-enabled with a back end server, as opposed to being an installed client.

An embodiment of the present invention also includes a computer program product executed by a processor on one or more computers.

Technical architectures utilized by embodiments of the technique are disclosed in U.S. patent application Ser. No. 14/163,547, and specifically in FIGS. 1 and 4. As aforementioned, this application is incorporated herein by reference in its entirety.

Returning to FIG. 1, in an embodiment of the present invention, client application 140 is installed on one or more resources of the computer system 110 and/or one or more computer resources accessible to one or more resources of the computer system 110. This exemplary embodiment is utilized merely to illustrate an embodiment of the present technique. The computer program code utilized in aspects of the present technique to perform a method, when executed by a processor, internal or external to a computer system 110, can be housed on a memory device that can be either internal or external to a physical machine (or multiple physical machines) executing the computer program code.

Throughout the application, portions of the program code that comprise embodiments of the invention may be referred to as modules. The modular representation of embodiments of the invention is offered just as an example and for ease of understanding. One of skill in the art will recognize that the structure of the actual program code can vary across embodiments while maintaining consistent functionality as disclosed herein.

Referring now to FIG. 2 as aforementioned, FIG. 2 depicts a technical environment in which aspects of the present system and method are applicable. Specifically, FIG. 2 is a wireless Smart energy network 100, including but not limited to an AMI network, that includes one or more backend management systems 140 connected to a multitude of access points 120a-120n and a number of meters 130a-130n, both in the field area network 110.

To analyze the traffic in the FAN 110, a number of probes intercept traffic. As seen in FIG. 2, a number of probes 150a-150n reside in various placed in the field area network 110, but there is also a probe 150a-150n in the backend 140 at a centralized point where the access points 120a-120n connect. To analyze the traffic on the Smart energy network 100 without interfering with the operation of the Smart energy network 100, for example, without burdening the network, a second network 160 connects to the probes 150a-150n to backhaul intercepted traffic from the probes 150a-150n to a traffic profiler system 170. As will be discussed in further detail, the second network 160 may be understood as a backhaul network, including but not limited to, a WAN.

FIG. 3 is a more detailed view of the traffic profiler system 170 from FIG. 2. This traffic profiler system 170 includes a collector pre-processor 171, a traffic aggregator 172, individual indicator group processors 173a-173n, one or more databases 174 connected to each processor, and a web server 175 that connects to the database 174. As will be described in more detail later in the application, the group processors 173a-173n obtain multiple streams from the collector pre-processor 171 and the traffic aggregator 172. In an embodiment of the present invention, different types of indicators are grouped together and processed using multiple processing resources in separate streams to increase the efficiency of the system. Once processed, the results can be retained in more than one database 174 or other memory resource. In order to obtain a visual of the indications from the indicators, a user may connect to the web server 175 via a client 180 and responsive the a request from the client and/or automatically, the code executed by the web server and/or the client may utilized the connection between the web server 175 and the database 174 to pull retained results and create visual representations of the results that are viewable on the client, including but not limited to, indicator charts.

In an embodiment of the present invention, the software saves indicator charts created by software executing in the group processors 173a-173n in the database 174 and software updates the collection of indicator charts in real-time every time there is an update to the web server 175.

Figure 6:
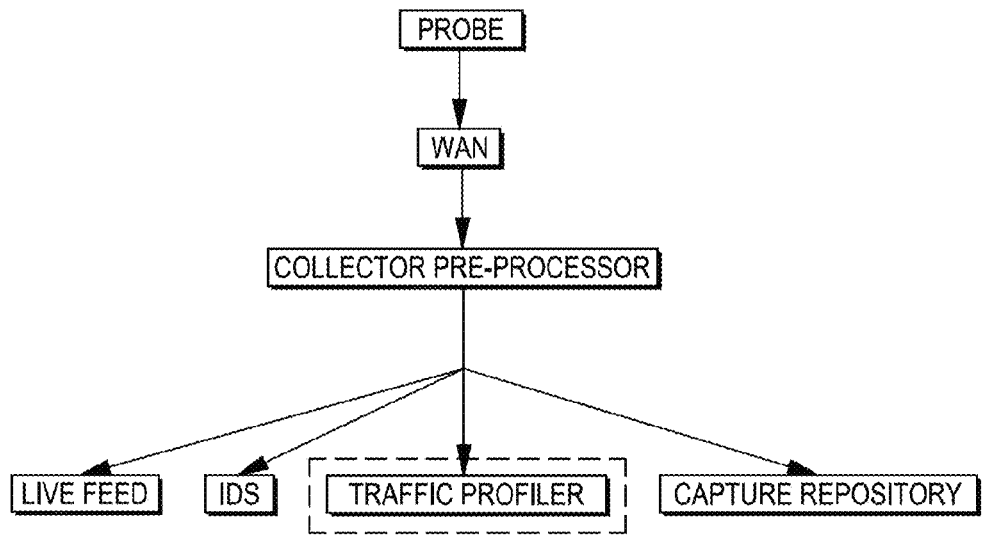
FIG. 6 depicts aspects of a dataflow model of an embodiment of the present invention.

FIG. 6 is a dataflow model of an embodiment of the present invention. As aforementioned, embodiments of the present invention obtain the same live traffic feed as is fed into the SecureSmart IDS (Intrusion Detection System), which is described in U.S. patent application Ser. No. 13/769,133. For each field probe in the system, the dataflow is as follows: a field probe actively and/or passively collects data packets that are intercepted over the air, data is transferred via a backhaul network, including but not limited to a WAN, and in embodiments of the present invention, utilizing a Secure VPN, to a backend server, computer program code executing on a processor (in embodiments of the present invention referred to as a Collector module) pre-processes the data, descrambling and processing headers, and the processed data flows downstream and is obtained by various software applications, including the TrafficProfiler, which is described in this application, Live Feed, IDS and Capture Repository.

Embodiments of the present invention produce metrics based on data input from multiple probes. These probes are described in U.S. patent application Ser. No. 13/769,133. In an embodiment of the present invention, computer program code executing on at least one processor combines two or more output streams into a single stream. This functionality of the computer program code can be understood at a "Traffic Aggregator" module.

Figure 7:
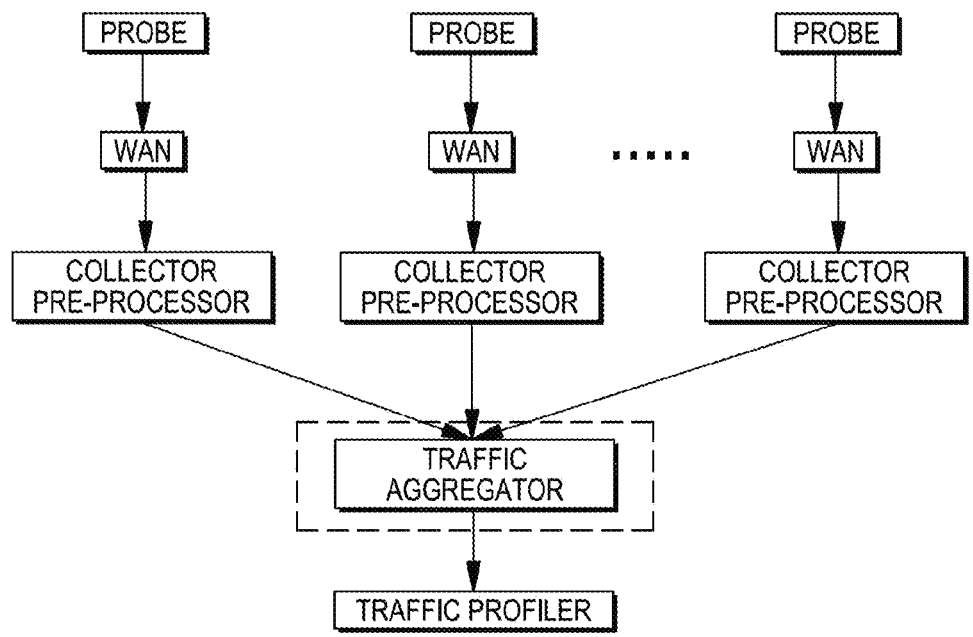
FIG. 7 depicts aspects of a dataflow model with traffic feed aggregation of an embodiment of the present invention.

Referring to FIG. 7 in an embodiment of the invention, that depicts the flow of network traffic from field probes and its flow through the Traffic Aggregator software module to the TrafficProfiler software module. As aforementioned, the modular representation of the software is utilized for ease of understanding. In FIG. 7, computer program code executing on one or more processors referred to as a "Traffic Aggregator" module obtains the output from a probe by making a connection, including but not limited to a UDP or TCP connection, to an application that collects and pre-processes each output stream, referred to in FIG. 7 as Collector Pre-Processor(s). The Traffic Aggregator software drops the global header (e.g., LibPCAP) from each output stream. The Traffic Aggregator receives requests from consumers, via the TrafficProfiler software module, and sends a combined output stream (with LibPCAP global header prepended) to the TrafficProfiler software executed by one or more processors.

Figure 8:
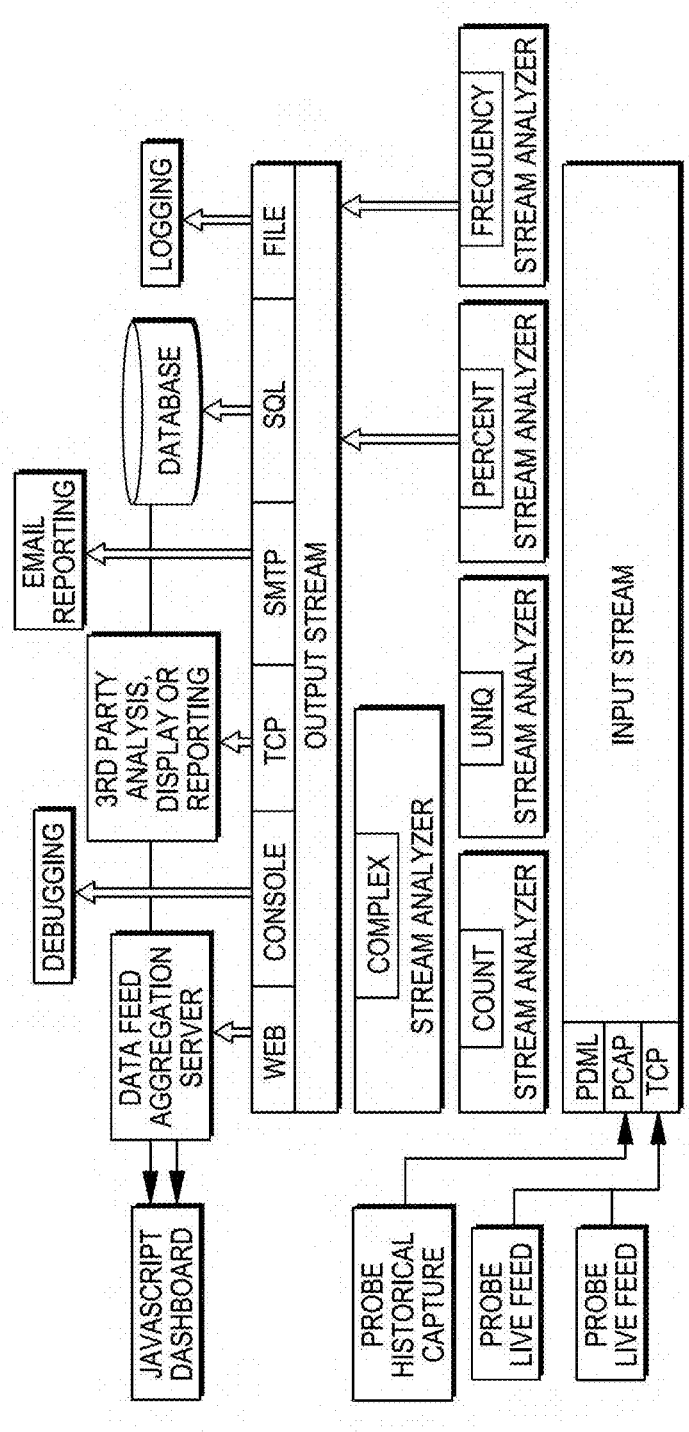
FIG. 8 depicts aspects of a technical architecture of an embodiment of the present invention.

FIG. 8 is a high level representation of the software architecture of the aforementioned TrafficProfiler module. In this embodiment, all components are fully modular and expandable through the use of plugins. Plugins are derived from base classes which implement basic functionality and means to communicate with other modules. Several input, analysis and output modules are included. In this embodiment, the various modules of the computer program code find each other on-the-fly using Python's introspection features and load dynamically at runtime. The analysis components are event-driven.

Referring to the embodiment of FIG. 8, functionality of the computer code is segmented within core modules (InputStream, StreamAnalyzer and OutputStream). These modules communicate with one another using callbacks. The modules use these callbacks to form a workflow that process packets from transmission to reporting.

Figure 9:
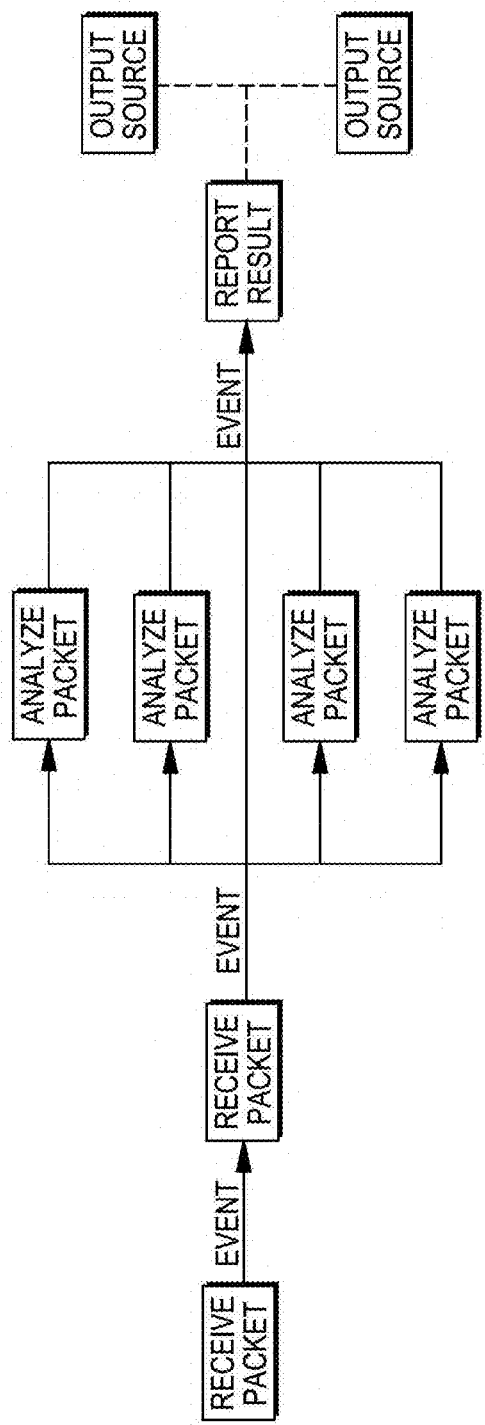
FIG. 9 depicts aspects of a workflow of an embodiment of the present invention.
Figure 11:
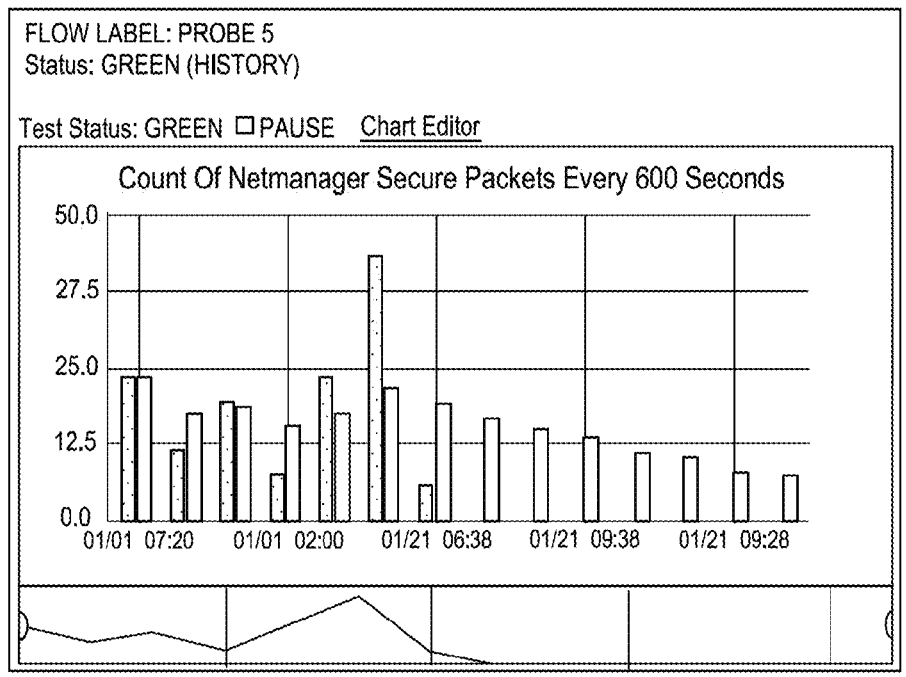
FIGS. 11-25 are examples of visuals produced by embodiments of the present invention.
Figure 12:
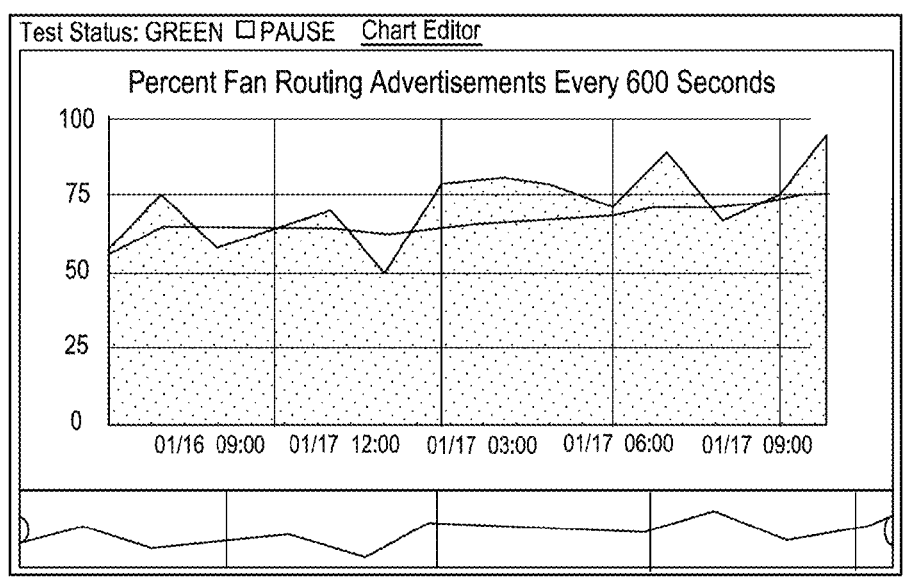
Figure 13:
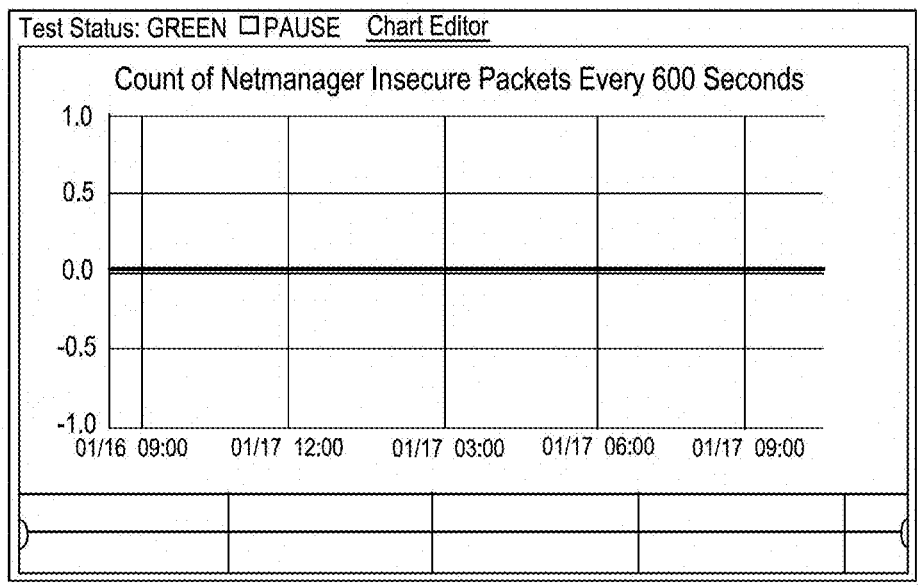
Figure 14:
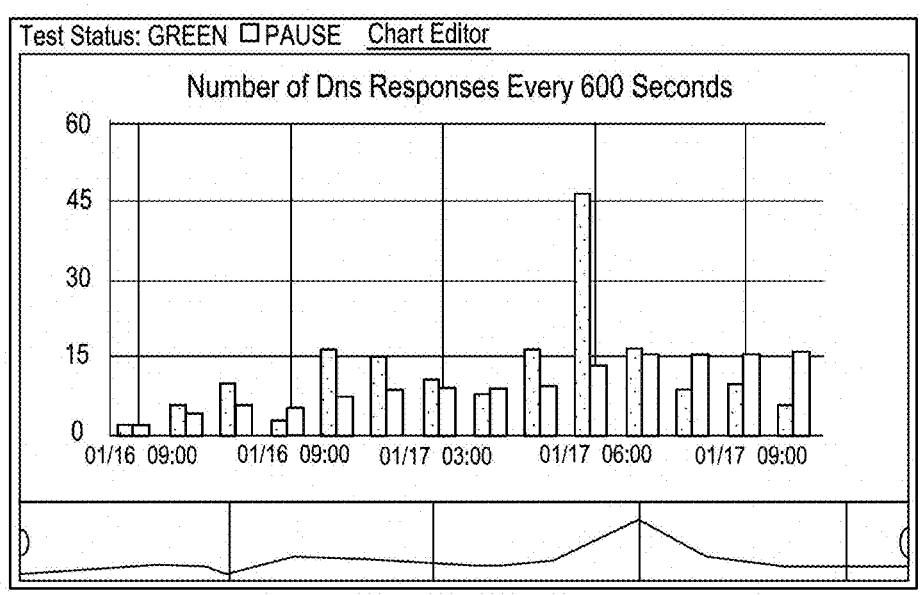
Figure 15:
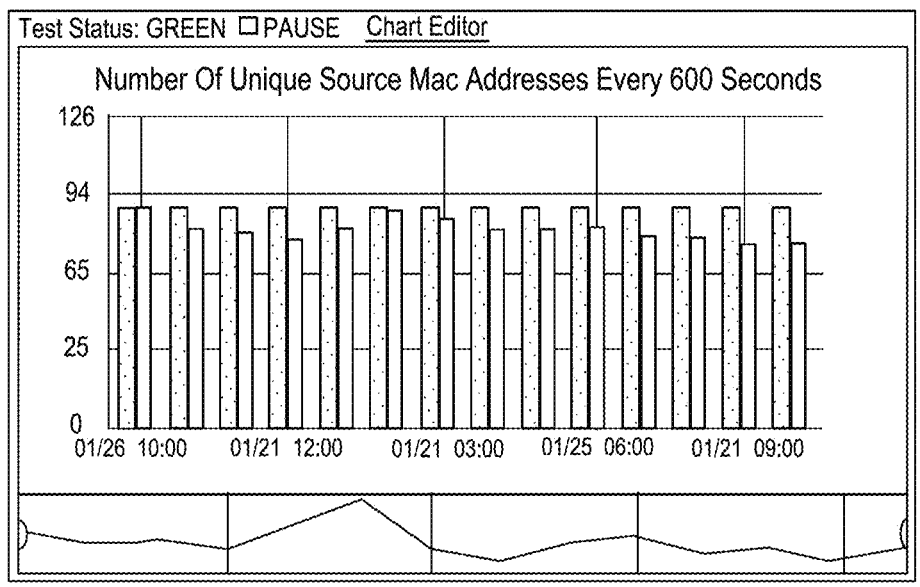
Figure 16:
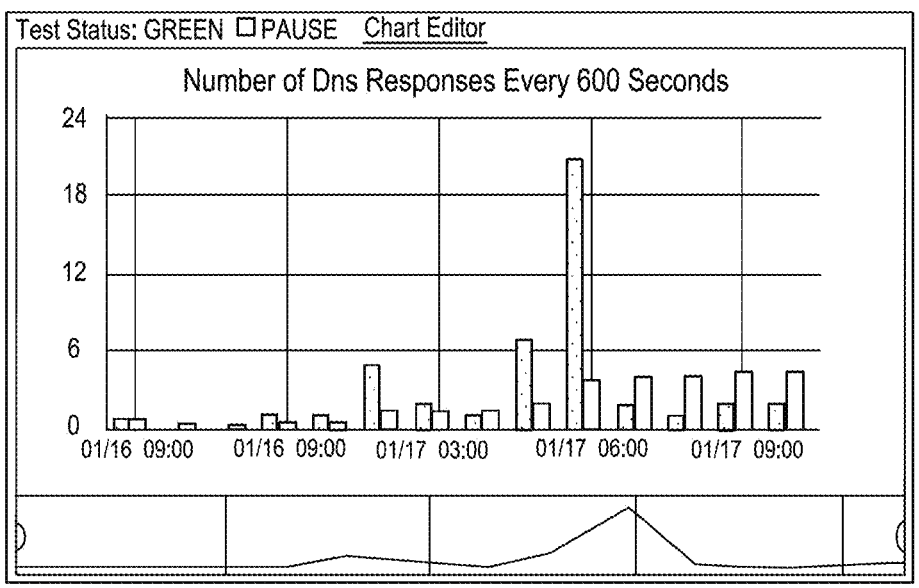
Figure 17:
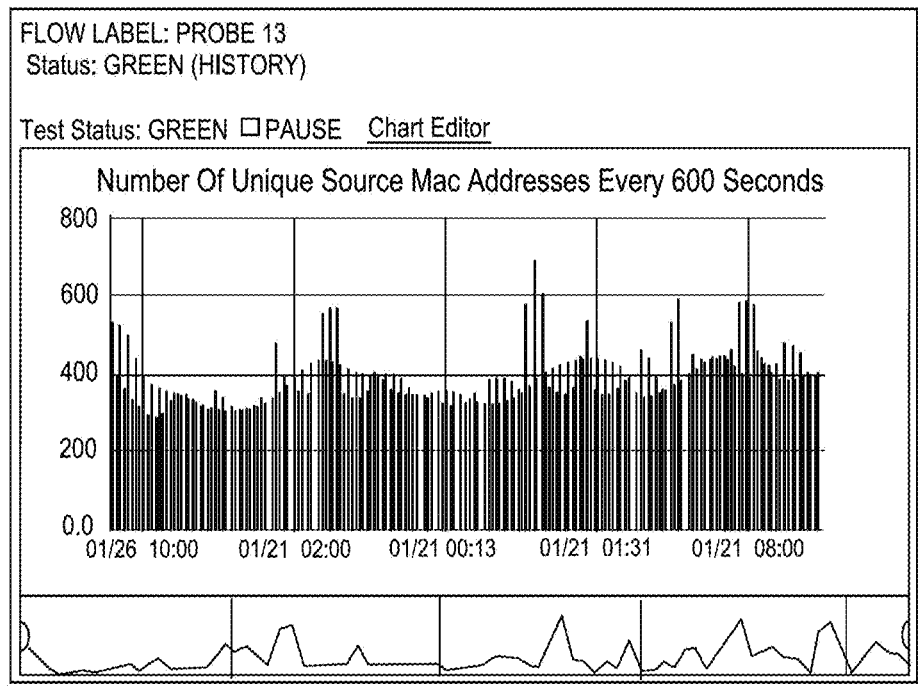
Figure 18:
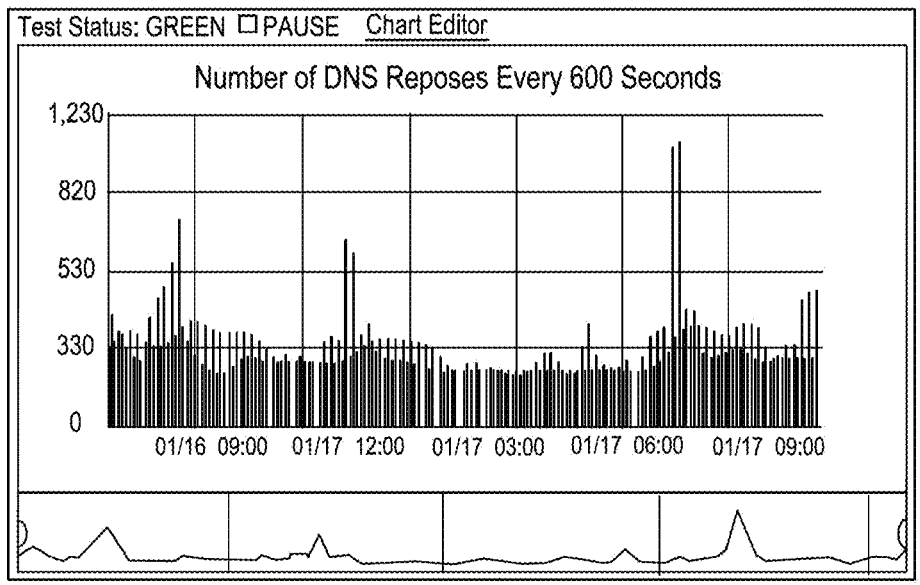
Figure 19:
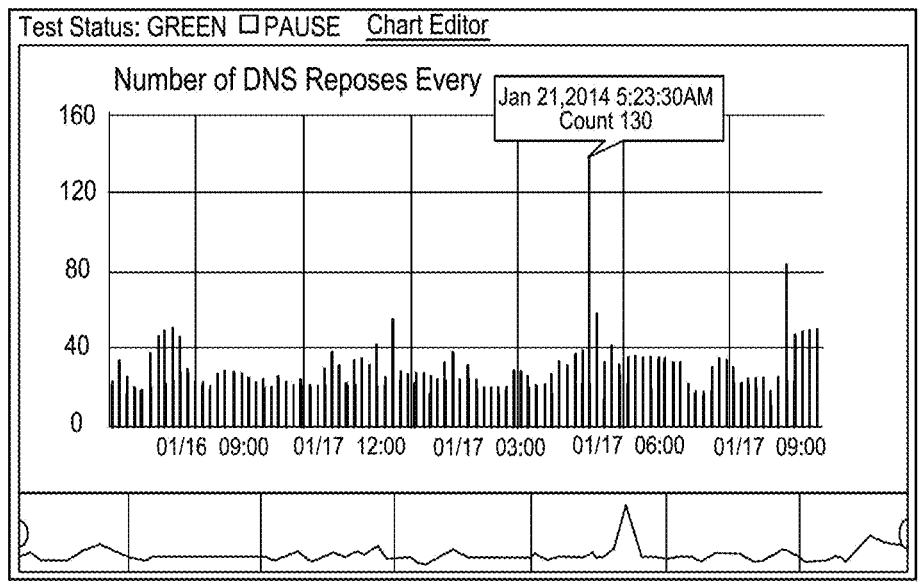
Figure 20:
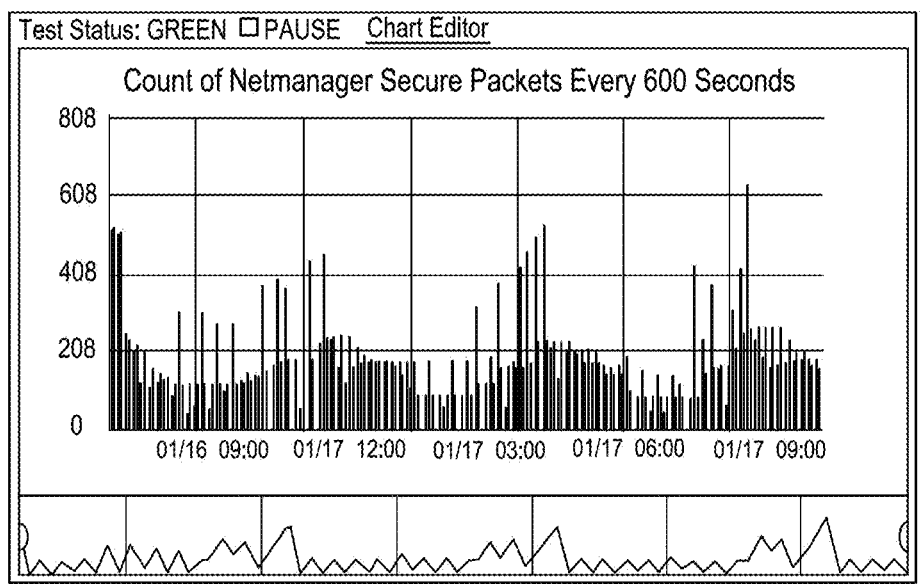
Figure 21:
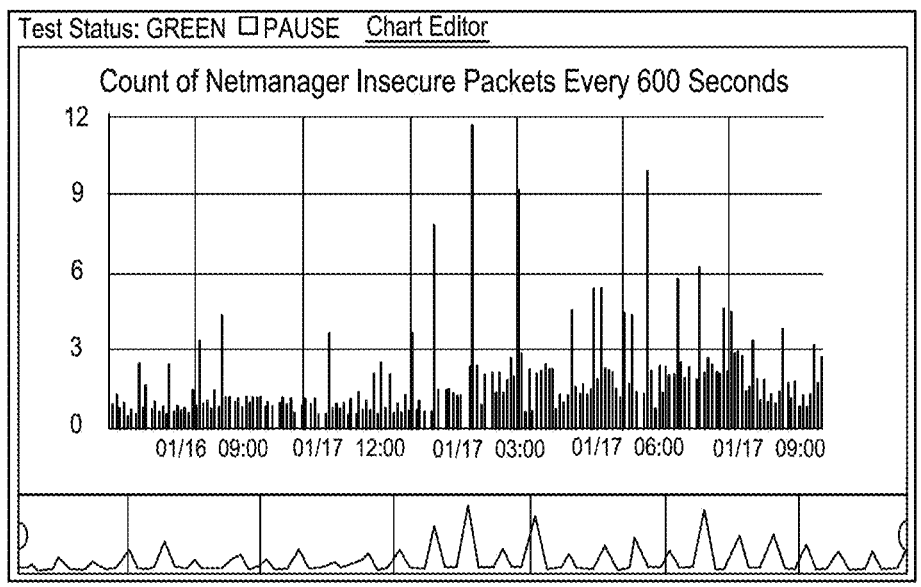
Figure 22:
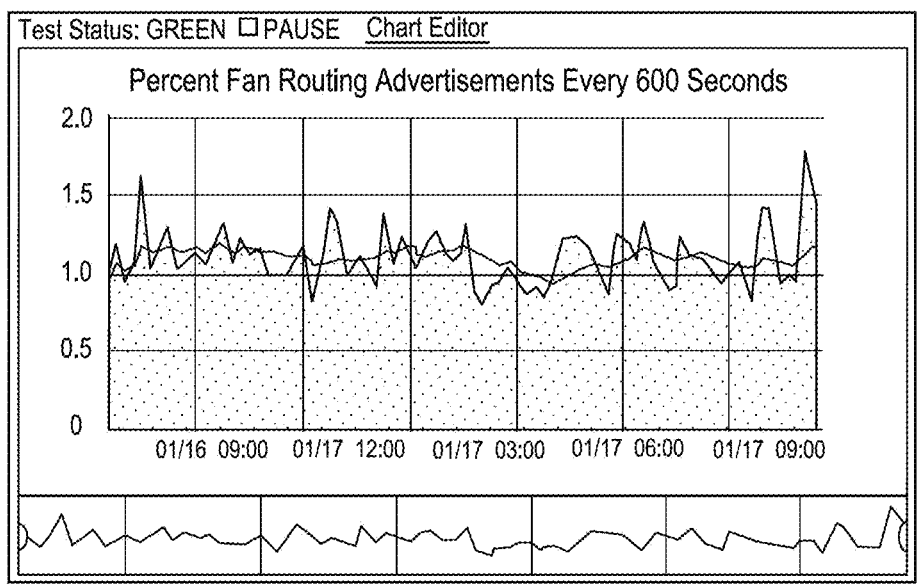

A basic workflow of an embodiment of the present invention is depicted in FIG. 9. In the embodiment of FIG. 9 the computer program code executing at least one processor and taking as input received packets, which were intercepted by a traffic interception system. The computer program code parses the packets, analyzes the packets based on configured indicators, and reports the result of the analysis.

In an embodiment of the present invention, indicators and workflow can be described in intuitively structured configuration files, which can be edited directly by the user or through a graphical interface. FIG. 10 is an example of such a configuration file.

As aforementioned, an embodiment of the present invention utilizes core modules InputStream, StreamAnalyzer and OutputStream to profile intercepted traffic from a FAN. In this embodiment, and as seen in FIG. 9, the InputStream module obtains a packet. The InputStream module receives packets through one or more streams, such as UDP or TCP and in one or more formats, including by not limited to PCAP and PDML. When TCP or UDP is utilized, it receives packets directly via a network connection in PCAP format. When PCAP is utilized, it allows a pre-captured file to be replayed through an included utility as though it were live data. Additionally this stream allows replay at variable speeds to quickly reproduce historical charts. When PDML is utilized, it similarly allows a pre-captured file, which has already been dissected and converted to the PDML format, to be ingested for replay at variable speed.

In an embodiment of the present invention, depending on the source, packet data is either decoded by a packet dissector in order to produce a PDML output of the packet, or passed on directly if already in PDML format.

After a packet is in a PDML format, the InputStream module parses out metadata about the packet. This metadata is then relayed to each registered StreamAnalyzer module for processing.

As seen in FIG. 9 the analyses on a packet can be divided among multiple processes to increase packet throughput and support additional indicators. In FIG. 9, each StreamAnalyzer module is configured to perform a single simple analysis on a packet stream. In further embodiments of the present invention, StreamAnalyzers can be "linked" together to perform more complex analysis, to split and rejoin streams or to direct StreamAnalyzer streams to different OutputStreams.

As aforementioned, the software analyzes time events by using packet timestamps, which were captured upstream, rather than relying on monitoring the inflow of packets in the stream with a local time base. Delay in backhaul connectivity and temporary backhaul connectivity loss will cause the flow in traffic streams to not match the actual traffic flow in the network being monitored. Thus, by using the packet timestamps, the software can maintain the timeline of the packets in the monitored networks and ensure indicators reflect the original timeline.

Use of packet timestamps supports the replay aspects of embodiments of the present invention. Packet timestamps, which are recorded at time of capture are the most accurate to use for statistical analysis. Embodiments of the present invention accept historical packet trace files, such as a .pcap files. Upon receiving this file, the software is configured to play back this traffic, at an accelerated rate, to generate indicator charts for that historical period. Even though the playback can be accelerated, the indicators maintain the proper timeline.

Returning to FIG. 9 the StreamAnalyzer modules analyze packets and determine whether events are present that indicate state changes. The software reports results based on events. Results include information regarding statistical analysis as well as any status information tied to the results. In an embodiment of the present invention, some of the status information can be rendered as alerts.

Status information provides a means for an analyzer to generate messaging through its registered OutputStreams for reporting various events, including but not limited to, anomalies in stream data, and/or state changes.

In an embodiment of the present invention, a user can utilize a graphical user interface to set thresholds related to events. A default configuration of the software enables a user to set hard thresholds for a test based on current vs. historical data and reports a Red, Yellow or Green status based on the result. In another embodiment of the present invention, the thresholds are related to statistical measurements, such as one or two standard deviations from the mean. In this case, the alerts dynamically track the data.

In an embodiment of the present invention, status information can be accompanied by a message, which can contain a detailed explanation of the alert. A default configuration of an embodiment of the present invention includes computer program code, that when executed by a processor, reports the time (as reported within the last packet received), the resulting value(s) of a test and amount of historical data held in state. The software displays these status messages in a GUI that is a JavaScript-based dashboard.

In an embodiment of the present invention, updates represent the result(s) of analysis performed by each StreamAnalyzer and flow through the StreamAnalyzer's registered OutputStreams. A default configuration of an embodiment of the present invention includes computer program code that uses these values to build graphs in the aforementioned dashboard.

Returning to FIG. 9 each of the analyzers has one or more registered OutputStream callbacks. Callbacks defined in various embodiments of the present invention include, but are not limited to, CONSOLE, FILE, SQL, TCP, UDP, SMTP and SYSLOG. CONSOLE is used for debugging purposes to simply print updates with status information to standard output. FILE is used to write output to a structured text file (CSV for example). SQL is used to send updates with status information to a MySQL database for historical logging or to preload charts in the JavaScript-based Dashboard. TCP is used to send to a server and port via the TCP protocol. UDP is used to send to a server and port via the UDP protocol. SMTP is used to send to a mail server. SYSLOG is used to send updates with status information to a syslog server for correlation with other network events. In embodiments of the present invention, users can utilize clients, such as those in FIG. 1, to configure parameters related to an OutputStream callback, which relate to the structure and/or behavior of the OutputStream callback.

In an embodiment of the present invention, the SQL OutputStream connects to a web server database server which allows connections from any number of SQL OutputStream modules. The OutputStream modules may be distributed across multiple servers. At least one SQL OutputStream will send a registration request with metadata describing indicator charts to the database server. The database server stores this information in a data structure, which is queried by the integrated web server to produce a dynamic HTML and JavaScript dashboard. An example layout is shown as FIGS. 11-25.

The charts in FIGS. 11-25 are just examples of possible visual indicators produced by the software. One of skill in the art will recognize that the data, once collected and analyzed in accordance with the techniques of the present invention, can be represented to a user in a GUI in many ways known in the art, such as graphs, charts, reports, etc. As an example, results can be represented in charts that are laid out by flows, as in FIGS. 11-25.

Utilizing a user interface, a user can interact with the program code to configure and view charts with different aggregations of data. In an embodiment of the present invention, customizable titles include the configured sampling frequency. Also, each chart has a status color, and each aggregate level also has a color, which is the color of the most serious status for any of the underlying charts. The top level also has a status color, which is the color of the most serious status across all underlying aggregates. A status history is kept for each chart and an expanded view reveals a scrollable list of status changes. This list can be sorted and filtered by time and status. In an embodiment of the present invention, program code executed by a processor enables the user to zoom and pan using slider functionality, viewable in FIG. 9, in order to explore the data. Redrawing of the chart can be paused while exploring, if desired. Data will continue to feed into the chart while it is paused.

In an embodiment of the present invention, StreamAnalyzers that include time series analyses can be displayed by the software and subsequently viewed in the dashboard as line/area/column charts. Further embodiments of the present invention may include StreamAnalyzer modules whose results may be more suited to bubble charts, pie charts, gauges, etc. When utilizing a user interface to configure each StreamAnalyzer, a user can specify the type of chart. Additionally, a user can change any chart in the Dashboard to another type using editing functionality in the software. The software obtains the changes made through the GUI and adjusts the display accordingly.

Figure 23:
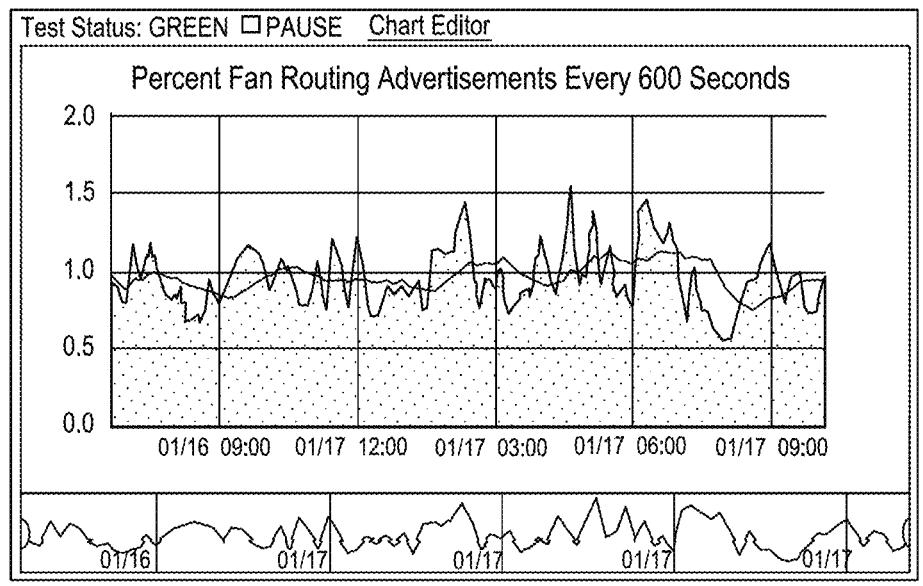
Figure 24:
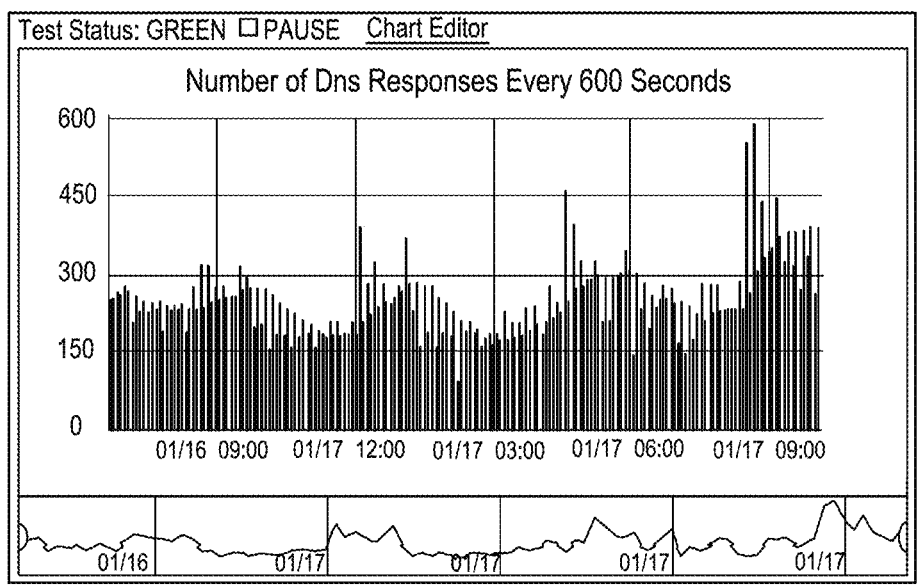
Figure 25:
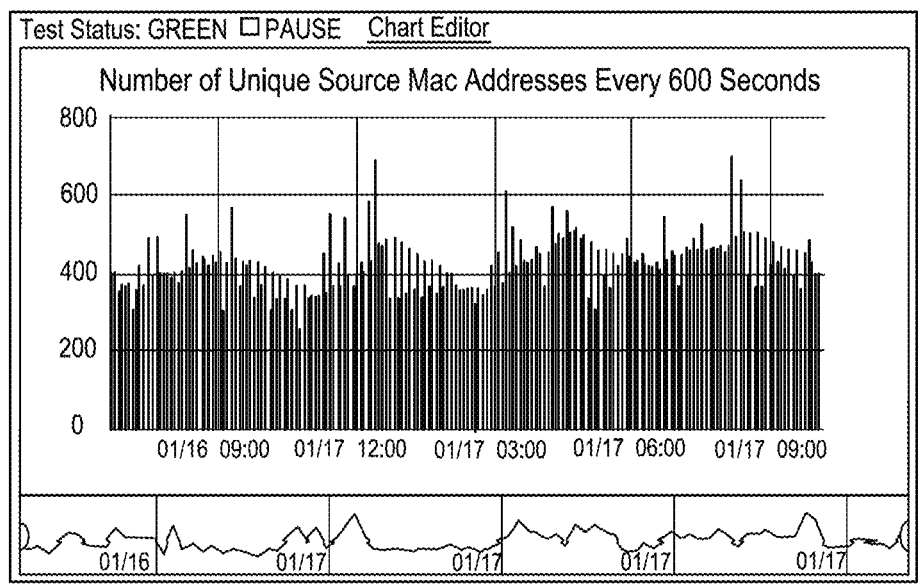
Figure 27:
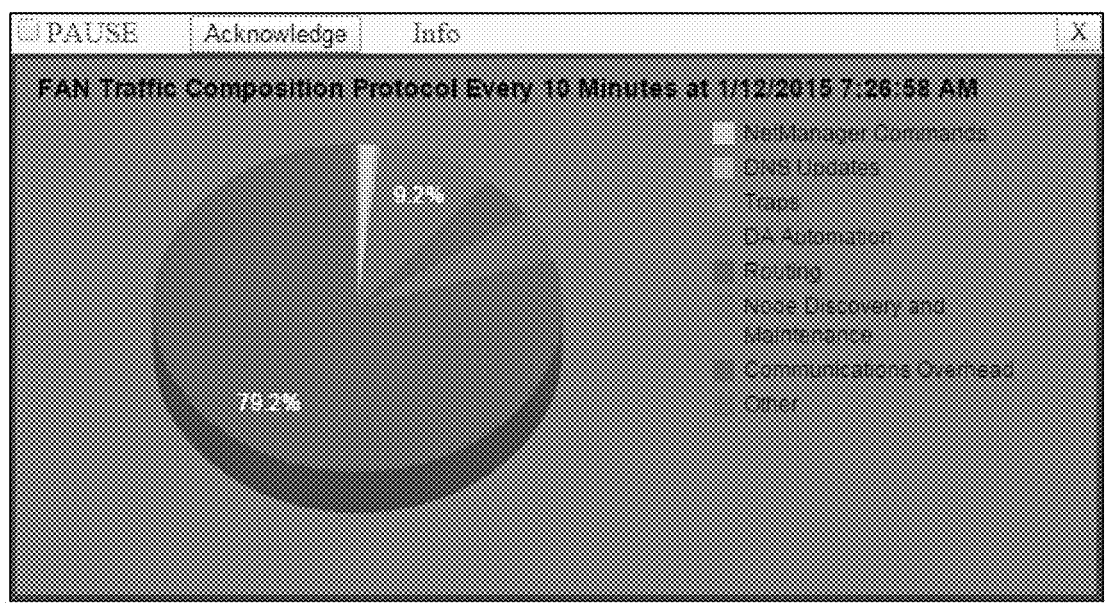
FIGS. 27-52 depict examples of visuals produced by embodiments of the present invention.

FIGS. 23-25 depict indicator displays generated by the software as results of two different types of stream analyses that can be completed by two different Stream Analyzer modules executed by one or more processors in an embodiment of the present technique. FIG. 23 depicts a PERCENT StreamAnalyzer charted in the Dashboard, while FIG. 24 depicts a COUNT StreamAnalyzer charted in the Dashboard, and FIG. 25 depicts a UNIQ StreamAnalyzer charted in the Dashboard.

Referring to FIG. 23, a PERCENT StreamAnalyzer was used to create an indicator chart in the Dashboard to monitor the percentage of mesh routing advertisements observed in a 600 second analysis window. This visual rendering by the software describes traffic that matches a user specified criteria (filtered field=mesh routing advertisement) over time with a user defined analysis window. The percentage of matched packets vs. unmatched packets in the current sample is shown and the average of the last 10 samples is shown as well.

Referring to FIG. 24, a COUNT StreamAnalyzer was used to create an indicator chart in the Dashboard to monitor the number of Domain Name Server response observed in a 600 second analysis window. This visual rendering by the software describes traffic which matches a user specified criteria (filtered field=DNS response) over time with a user defined analysis window. The count of matched packets in the current sample is shown and the average of the last 10 samples is shown in as well.

Referring to FIG. 25, a UNIQ StreamAnalyzer was used to create an indicator chart in the Dashboard to monitor the number of unique source MAC addresses observed in a 600 second analysis window. This visual rendering by the software describes traffic which matches a user specified criteria (filtered field=a unique source MAC) over time with a user defined analysis window. The count of unique MAC addresses in the current sample is shown and the average of the last 10 samples is shown as well.

The software updates the collection of indicator charts in real-time every time there is an update to the database. To obtain and apply these updates, a background process always polls one or more database server(s) for more data. In an embodiment of the present invention, the Web Worker specification in HTML is utilized to poll a web server which in turn queries the database. When the server(s) has (have) no data to return it has been specially configured to not let the connection hang, but rather to background it. When the server does have data to return, it sends the data immediately. A process, including by not limited to the Web Worker, parses and forwards data to the program code that interprets the rendering of the GUI and refreshes the indicator charts in the Dashboard. In one embodiment, the main JavaScript event loop in the browser receives and implements the updates to the charts. Upon an update, the process, for example, the Web Worker, immediately initiates a new connection to wait for new data. When the Web Worker is employed, this architecture approximates real-time push notifications over HTML.

In an embodiment of the present invention, if the server, such as a web server, receives multiple updates between responses to the client (which often happens at high traffic volumes), the server queues the updates and sends them all in a single batch during the next client response. This maximizes the throughput of the system and eliminates the possibility of missed updates.

Lastly, in embodiments utilizing a SQL OutputStream operator, if this operator is in use, charts can preload using data from a computer readable storage medium, such as a database. This way it is not necessary to wait for new data to populate each chart. The number of data points to preload is configurable. Status information as well can be preloaded from the database in the same manner to populate the history of status changes in the Dashboard. In an embodiment of the present invention, the status information can include a history of statuses that rise to a level of alert, as determined by pre-configured thresholds.

As aforementioned, the present technique can be combined with techniques disclosed in U.S. patent application Ser. No. 13/769,133 and U.S. patent application Ser. No. 13/769,111. The former of these applications discusses the functionality of a method, system, and computer program product referred to as "MeshView," which is a FAN network analysis tool. Separate from the traffic analysis disclosed in this application, the overall FAN network intelligence can be increased by utilizing a large database with MeshView to improve application responsiveness. Utilizing the MeshView interface, which is discussed in more detail in U.S. patent application Ser. No. 13/769,133, on screens such as Sources and Destinations, where a set of database queries are made to determine all unique sources or destinations in the filtered data set, application responsiveness is improved by using a feature called "lazy pagination," which is integrated into the computer code. The code embodying this functionality, rather than render a single page with thousands of sources or destinations, the query returns the total count in the selection, the first N sources or destinations and a set of links to the remaining sources or destinations, segmented into groups of N. When a link is selected, a new query design to gather the appropriate group of N sources or destinations and their related info is launched. The smaller query significantly reduces database processing time and reduces application latency.

Code embodying the "lazy pagination" feature is also executed on the Timeline plot in MeshView to significantly improve the performance of the plot and still enable the user to view all the packets. The links to the remaining packets are labeled with the timeframe they represent so that the user can select a group of interest based on time. The smaller query significantly reduces database processing time and reduces application latency.

The concept of a "heat map" is applied to concisely represent figures of merit for devices within an area on a geographic or satellite map using geographic information system coordinates, where a service area is divided into a collection of polygons that tile the area and the figure of merit is calculated for each geographic tile and the color of the tile is set based on the magnitude of the result. The "heat map" is convenient for conveying the mesh hop count, RF signal level, node connectivity, and node communications activity, among other figures of merit.

Data segmentation is applied to the MeshView database in whole because large databases are slow to return complex queries. In embodiments of the MeshView technique, at predefined intervals of two or three weeks, the MeshView database is automatically saved and a new instance of the database is created. MeshView users set a timeframe filter, for example, using a part of the Filter page, and the software selects one or more small databases and manage queries to each as appropriate. Alternatively, the user can select a database by a user selection. Performance is greatly improved as a small database with two weeks to two months of packet data (~3 to 30 million packets) is more responsive than a large database that contains multiple years of packet data (~1 billion packets).

As discussed above, embodiment of the present invention define different analysis operations that can be applied to field expressions to indicate certain conditions. In embodiments of the present invention, indicators designed to detect intrusion may also report information about network health. Some indicators have already been discussed, but some embodiments of the present invention define six (6) analysis operators that can be used in field expressions to create a variety of indicators. These six analysis indicators include:

COUNT (Tally a count of packets or bytes satisfying the field expression over the analysis window. This operator is also used to create traffic utilization charts.

UNIQUE: Tally a count of unique values resulting from the field expression over the analysis window.

AVERAGE: Calculate the average value of the field expression over the analysis window.

PERCENTAGE: Calculate a percentage of packets that satisfy the field expression over the analysis window.

RATIO: Calculate the ratio of packets satisfying a first field expression to a second field expression.

LATENCY: Calculate the time latency between two packets (typically a request and response) linked by a common ID or sequence number.

FREQUENCY: Calculate the average time between occurrences of specified events.

In an embodiment of the present invention, indicator charts are created by selecting an analysis operator to apply to one or more dissected fields extracted from incoming traffic. Dissected fields can be combined using field logic (AND, OR, NOT, etc.).

FIG. 26 is an example indicator definition for DA Management and DNS Traffic (Packets). The selected analysis is COUNT. In an aspect of the present invention, the analyzer counts packets satisfying the field expression. The field expression consists of three dissected fields combined with a logic OR. The first dissected field is an IPv6 address to match against either source or destination address in an IPv6 packet. The second dissected field is an IPv6 prefix to match against the source or destination address of an IPv6 packet. The third dissected field is an IPv4 address to match against either source or destination address in an IPv4 packet.

Embodiments of the present invention allow the flexibility of utilizing different indicators depending upon the hardware and software conditions of the network, such as a FAN, upon which traffic is profiled. Certain considerations may affect indicator selection. These conditions include, but are not limited to, window size/type, behavior (e.g., patterned versus spike behavior), visual representation (e.g., chart type). In an embodiment of the present invention a 10-minute window size was selected, but various embodiments of the present invention enable each indicator to have its own time base, allowing for a combination of both fast and slower indicators. In an embodiment of the present invention, to understand behavior indicators that typically have stable (non-zero) states or appear cyclical are utilized in traffic analysis to detect anomalies in normally patterned behavior. Embodiments of the present invention represent indicator results are bar charts, candlestick charts (e.g., for indicators that measure averages or latency), gauges (e.g., for indicators that might have fixed thresholds).

In an embodiment of the present invention, the program code executing on at least one processor creates automatic baselines and learns, for example, by storing a configurable amount of state for each indicator during its learning phase. Once a state is filled, it is used as the baseline for future traffic. In an embodiment of the present invention bucketing of information data was applied in the formation of indicator baselines. Bucketing groups data for a specific indicator by hour of day, day of week, or day of year (or any combination of the three) and is configured on a per-indicator basis. For indicators that peaked and fell at predictable times, it made sense to bucket hourly. This means that analysis results for these indicators computed at a particular hour of the day were compared only with baseline values computed during that same hour of day. Day of week bucketing may be for indicators that peaked and fell based on a particular day of the week. Combining hourly and day of week may group together results that happened on a particular week day at a particular time. Monthly bucketing may work similarly. Some embodiments of the present invention use four hourly bucketing cycles to detect 4-hour meter reads.

In an embodiment of the present invention, a baseline state for each indicator may be stored as a simple text file. As a text file, the state information can be modified or regenerated manually and provide the flexibility to import baseline data using alternate methodologies, which could potentially improve anomaly detection.

As aforementioned, indicators utilized by embodiments of the present invention may vary; however, in an embodiment of the present invention, forty-two (42) indicators have been identified as key indicators to monitor the FAN health of select AMI and DA networks. In the aforementioned embodiment, the exemplary 42 indicators can be organized into seven (7) indicator affinity groups as shown in the Table 1 below. Indicators are executed by the program code as described in conjunction with the described technical environment.

TABLE 1

| Indicator Group | Indicator | AMI Traffic | DA Traffic |
|---|---|---|---|
| FAN Traffic | FAN Traffic Composition - Protocol | X | X |
| | FAN Traffic Composition - Protocol (No Overhead) | X | X |
| | Total FAN Traffic (Packets) | X | X |
| | AMI IPv6 FAN-Backend Traffic (Packets) | X | |
| | AMI IPv6 Backend Inbound/Outbound Packet Ratio - Not Implemented | X | |
| | AMI IPv6 FAN Sourced Traffic (Packets) | X | |
| | Communications Link Success | X | X |
| | Percent Handshake Overhead Traffic | X | X |
| Security, Privacy, and Safety | Unique FAN Source Nodes | X | X |
| | Unique FAN Destination Nodes -Not Implemented | X | X |
| | Encrypted Command Traffic - UDP 648 (Packets) | X | X |
| | Unencrypted Command Traffic - UDP 648 (Packets) | X | X |
| | Unencrypted Command Traffic - UDP 645 (Packets) | X | X |
| | Gateway Advertisement Traffic (Packets) - Not Implemented | X | X |
| | Trap Traffic (Packets) | X | X |
| | Percent MLME Security Usage | X | X |
| | MLME Version | X | X |
| | AMI Gateway Inbound Traffic (Packets) - Not Implemented | X | |
| | DNP3 Traffic in the Clear (Packets) - Not Implemented | X | X |
| FAN Routing | Network Registration Requests (Packets) | X | X |
| | Network Registration Request/Response Ratio- Not Implemented | X | X |
| | Average FAN Gateway Path Cost | X | X |
| | AMI Average Hop Count (+1) | X | |
| | Routing Traffic (Bytes) | X | X |
| | Node Discovery and Maintenance Traffic (Packets) | X | X |
| | Average IPv6 Hop Limit | X | X |
| DA SCADA | DA SCADA Traffic (Packets) | | X |
| | DA Management and DNS Traffic (Packets) | | X |
| | DA IPv4 Inbound/Outbound Packet Ratio | | X |
| | Average IPv4 Hop Limit | X | X |
| Smart Grid Service | Firmware Update Traffic (Packets) | X | X |
| | AMI Meter Read Traffic -Not Implemented | X | |
| | HAN Traffic (Packets) -Not Implemented | X | |
| | Direct Load Control Traffic (Packets) Volume - Not Implemented | X | X |
| | Gas Meter Read Traffic - Not Implemented | X | |
| Network Service | DNS Update Traffic (Packets) | X | X |
| | DNS Update Request/Response Packet Ratio | X | X |
| | DNS Transaction Latency Range (Seconds) | X | X |
| | Hourly DNS Transaction Latency Range (Seconds) | X | X |
| Network Performance | Unencrypted Command Latency Range - UDP 645 (Seconds) | X | X |
| | Command Latency Range - UDP 648 (Seconds) | X | X |
| | Hourly Command Latency Range - UDP 648 (Seconds) | X | X |

In an embodiment of the present invention, the FAN Traffic Indicator Group indicators measure different attributes of FAN traffic composition and volume in the AMI and DA networks.

Figure 28:
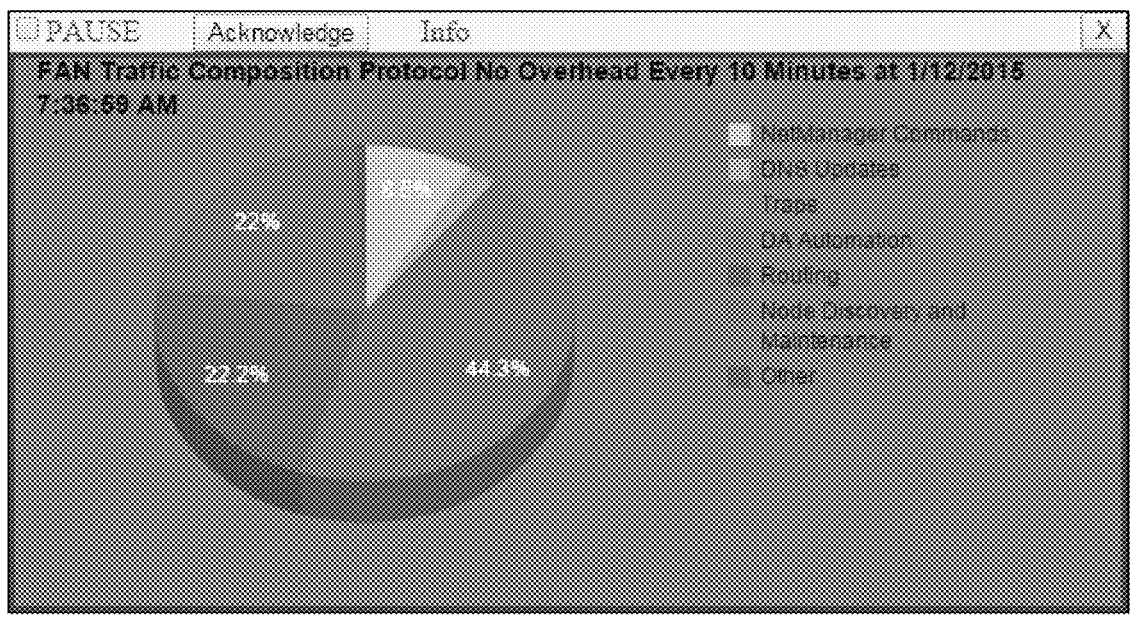

In an aspect of the present invention, a FAN Traffic Composition-Protocol Indicator calculates the percentage of packets for each traffic type observed across both AMI and DA networks during the analysis window. The traffic profile is a sort of fingerprint for the area monitored by a probe or set of probes. Traffic type can be aligned according to protocol or service application. When calculated based on service application, for example, meter reading, DA SCADA and Home Area Network Traffic, the FAN Traffic Composition Indicator-Service shows which applications generate the most traffic. FIG. 28 is an example indicator chart generated in a graphical user interface (GUI) by the program code for viewing by a user, based on protocol for FAN Traffic Composition-Protocol.

In an embodiment of the present invention, The FAN Traffic Composition-Protocol (No Overhead) Indicator calculates the percentage of packets for each traffic type excluding communications link handshake overhead packets observed in the AMI and DA networks during the analysis window. By excluding communications link handshake overhead packets, which tend to dominate FAN traffic, the FAN Traffic Composition-Protocol (No Overhead) Indicator zooms in on just the data-carrying traffic that effectively makes up the collective 20-25% wedge of application, routing, and maintenance traffic in the FAN Traffic Composition-Protocol Indicator. Similar to the FAN Traffic Composition-Protocol Indicator, the FAN Traffic Composition-Protocol (No Overhead) is a sort of fingerprint for the area monitored by a probe or set of probes. Traffic type can be aligned according to protocol or service application. When calculated based on service application, for example, meter reading, DA SCADA and Home Area Network Traffic, the FAN Traffic Composition Indicator-Service (No Overhead) shows which applications generate the most traffic excluding overhead. An example indicator chart for FAN Traffic Composition-Protocol (No Overhead) is shown below.

Figure 29:
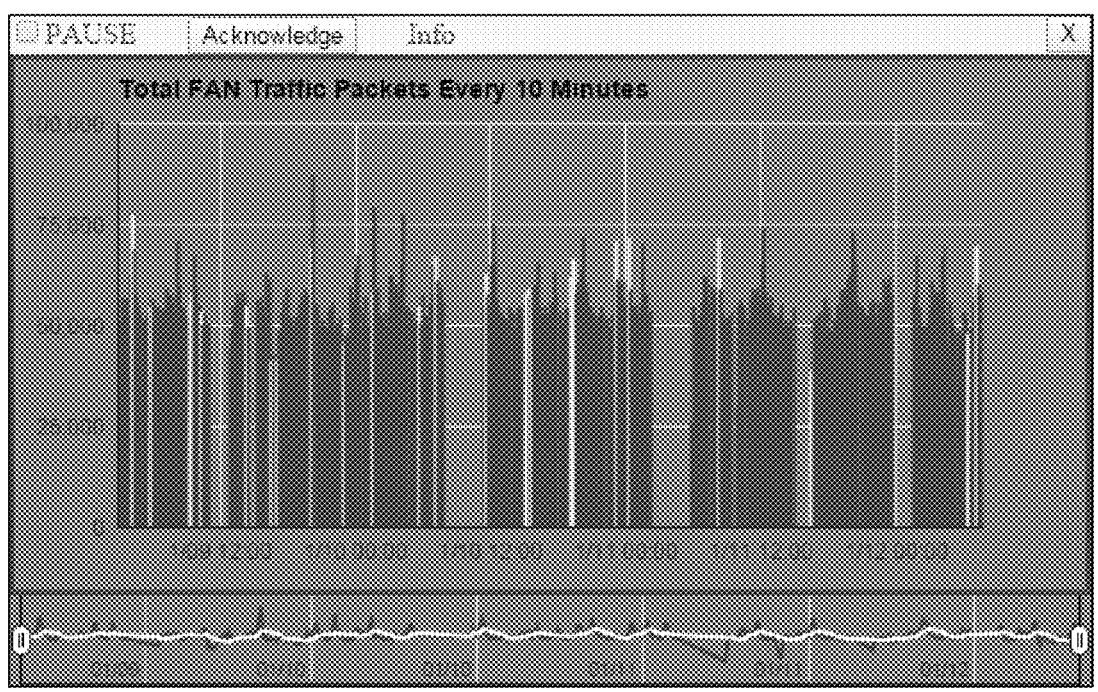

In some embodiments of the present invention, the Total FAN Traffic (Packets) Indicator calculates the total number of FAN packets observed in the AMI and DA networks during the analysis window. In an aspect of certain embodiments, disregarding ambient mesh maintenance traffic, FAN packet volume is correlated to Smart Grid applications, such as meter reading and SCADA monitoring. FIG. 29 is an example indicator chart for Total FAN Traffic (Packets) is shown below. The characteristic peaks of meter reading jobs occurring at 4 hour intervals or six times per day are observed. SCADA traffic, which is more continuous in nature, tends to fill the "gaps" between meter read jobs.

Figure 30:
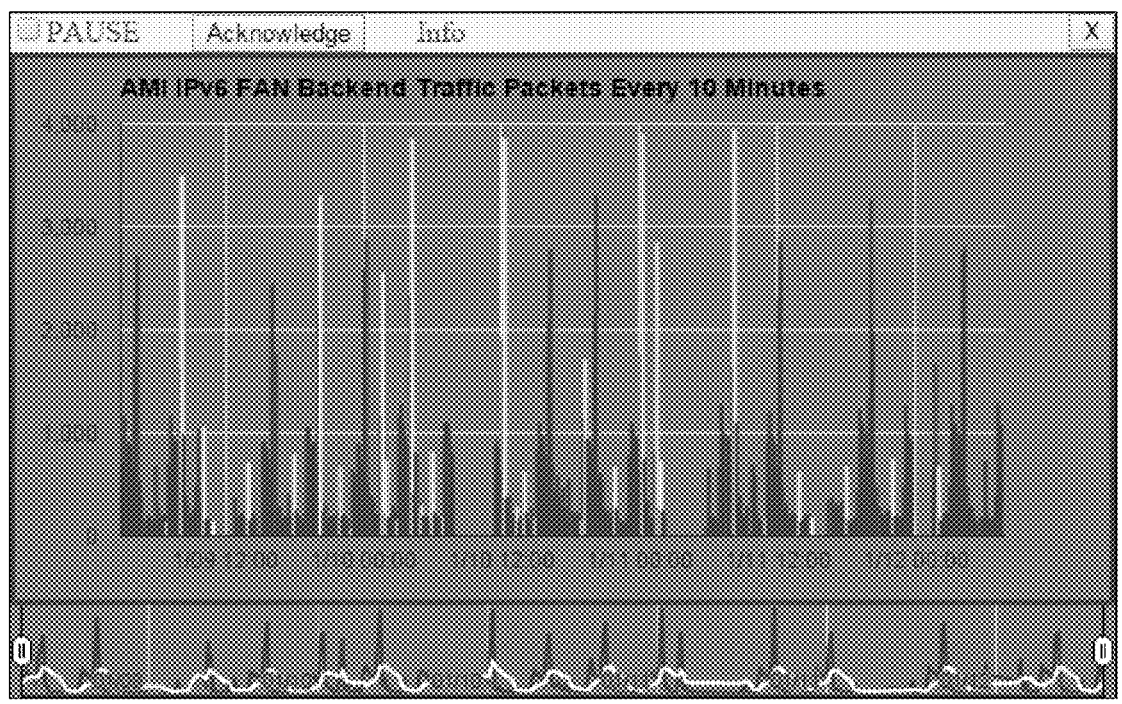

In an embodiment of the present invention, the AMI IPv6 Backend Traffic (Packets) Indicator calculates the total number of FAN packets containing embedded IPv6 traffic whose source or destination is a backend system serving the AMI network observed during the analysis window. The AMI IPv6 FAN-Backend Traffic (Packets) Indicator excludes DA SCADA traffic, as well as other packets, such as routing maintenance and overhead packets generated by AMI nodes that do not contain embedded IPv6 traffic. The AMI IPv6 FAN-Backend Traffic (Packets) Indicator is highly correlated to AMI operations, such as meter reading, and is typically an indicator of AMI traffic flowing between field nodes and backend systems. Other traffic that traverses the backend includes DNS, Firmware Updates HAN Management, and Security. A single packet originating from or destined to the backend may be counted multiple times if the packet is intercepted by a probe on multiple hops in the FAN. FIG. 30 is an example indicator chart for AMI IPv6 FAN-Backend Traffic (Packets). The characteristic peaks of meter reading jobs occurring at 4 hour intervals or six times per day are observed.

Figure 31:
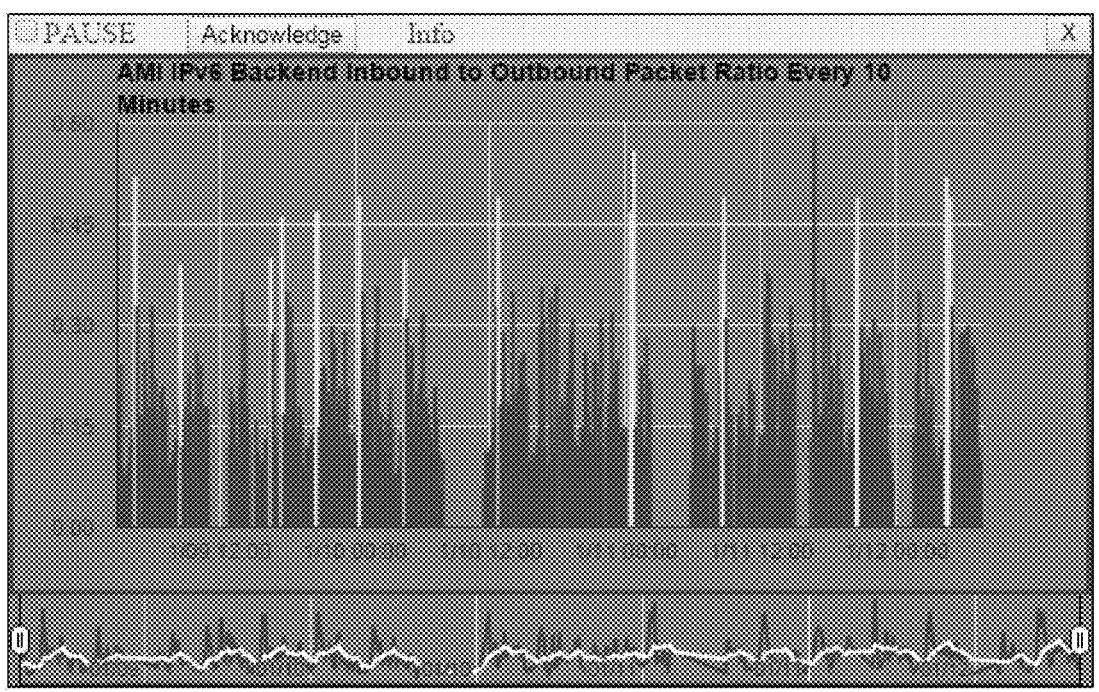

In embodiments of the present invention, the AMI IPv6 Backend Inbound/Outbound Packet Ratio Indicator tracks the ratio of inbound IPv6 FAN packets to outbound IPv6 FAN packets to and from the AMI backend during the analysis window. The AMI IPv6 Backend Inbound/Outbound Packet Ratio Indicator primarily uses embedded IPv6 traffic associated with AMI operations, such as meter reading and HAN communications, as well as network services traffic, such as DNS, and security maintenance. A single packet originating from or destined to the AMI backend may be counted multiple times if the packet is intercepted by a probe on multiple hops in the FAN. However, if both inbound and outbound traffic are observed equally on multiple hops, the AMI IPv6 Backend Inbound/Outbound Packet Ratio should not be affected. An AMI IPv6 Backend Inbound/Outbound Packet Ratio significantly larger than 1 indicates field node difficulty to reach backend systems or possibly an effort by malicious field nodes to penetrate backend systems from the wireless mesh. FIG. 31 is an example indicator chart for the AMI IPv6 Backend Inbound/Outbound Packet Ratio.

Figure 32:
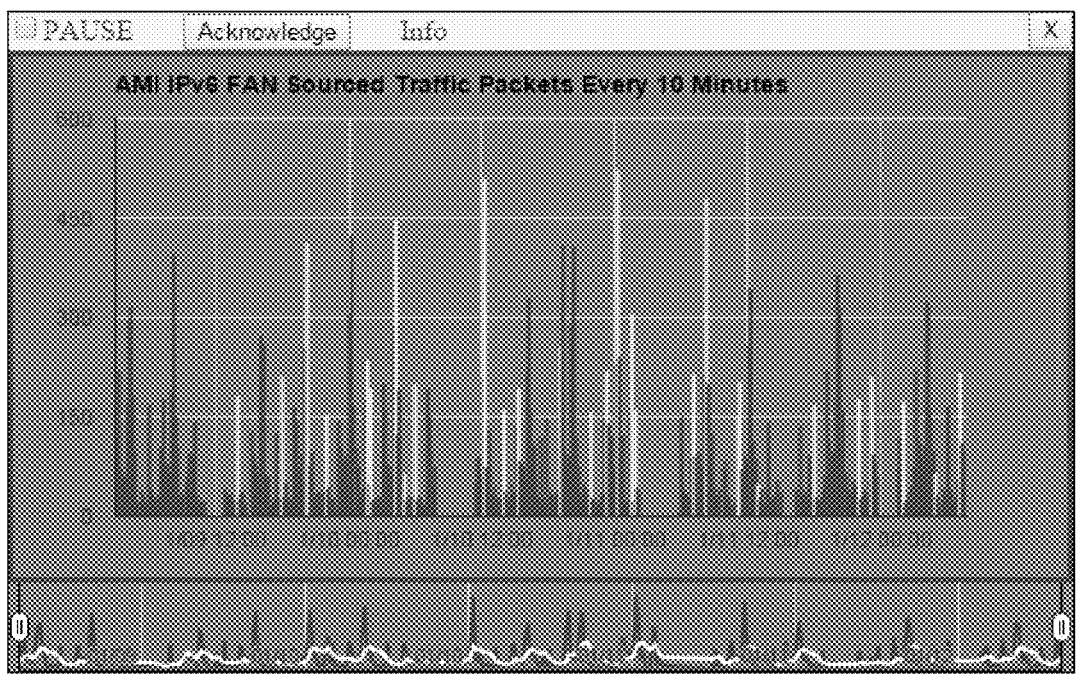

In embodiments of the present invention, the AMI IPv6 FAN Sourced Traffic (Packets) Indicator calculates the number of FAN packets containing embedded IPv6 traffic whose source is a node observed in the AMI network during the analysis window. The AMI IPv6 FAN Sourced Traffic (Packets) Indicator excludes DA SCADA traffic, as well as other packets, such as routing maintenance and overhead packets generated by AMI nodes that do not contain embedded IPv6 traffic. The AMI IPv6 FAN Sourced Traffic (Packets) Indicator is highly correlated to AMI operations, such as meter reading. Other traffic that uses an IPv6 FAN source includes DNS, Firmware Updates, HAN Management, and Security. A single packet originating from an IPv6 FAN source may be counted multiple times if the packet is intercepted by a probe on multiple hops in the FAN. FIG. 32 is an example indicator chart for AMI IPv6 FAN Sourced Traffic (Packets). In the example below, the characteristic peaks of meter reading jobs occurring at 4 hour intervals or six times per day can be observed.

Figure 33:
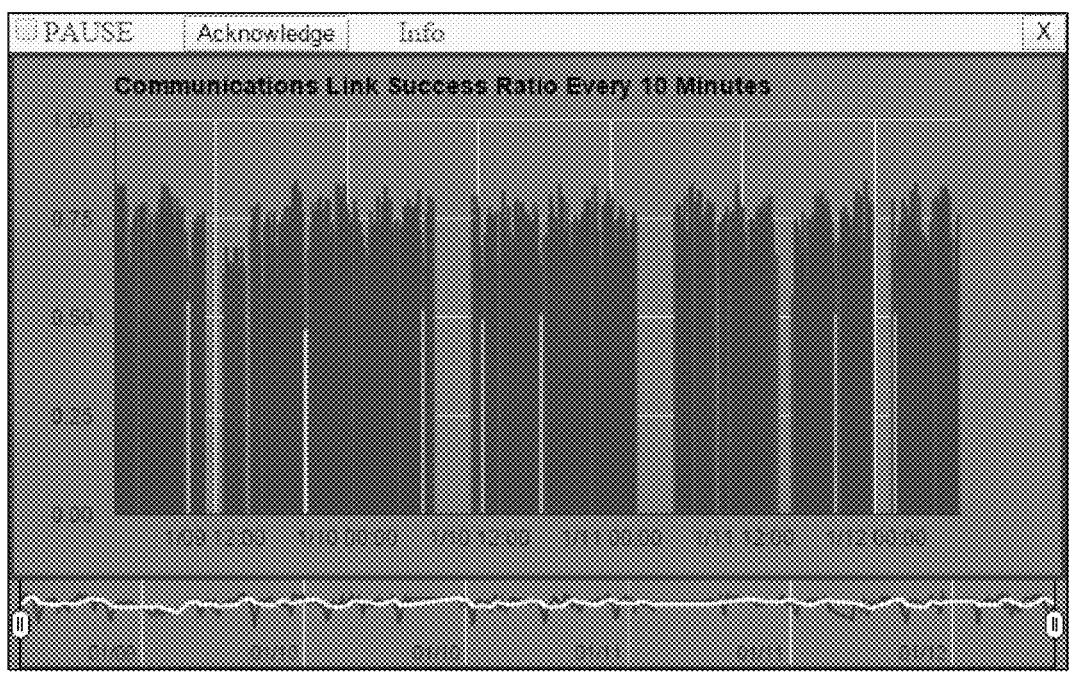

In embodiments of the present invention, the Communications Link Success Indicator calculates the ratio of successful communication link exchanges (i.e., those with a data packet acknowledgment) to communication link attempts observed in the AMI and DA networks during the analysis window. A low communication link success rate indicates that field nodes are having trouble communicating with one another, when the communication distance is 1 hop. FIG. 33 is an example indicator chart for Communications Link Success.

Figure 34:
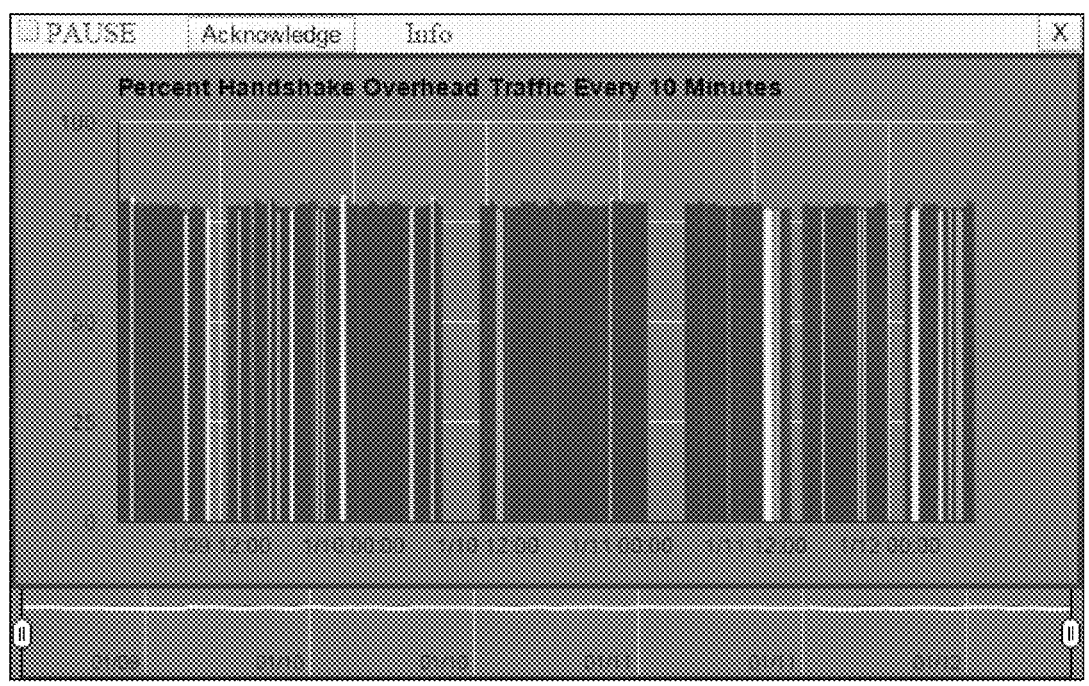

In embodiments of the present invention, the Percent Handshake Overhead Traffic Indicator calculates the percentage of handshake overhead packets to all FAN packets observed in the AMI and DA networks during the analysis window. It is a measure of overhead traffic in the network. In certain AMI and DA networks, the handshake overhead percentage for a unicast communications link transaction is typically 75% for a successful single data packet communications link, i.e., one data packet for three overhead packets. Some packets are broadcast and do not create a communications link. A higher handshake overhead percentage indicates communication link failures are occurring within the mesh. FIG. 34 is an example indicator chart for Percent Handshake Overhead.

In an embodiment of the present invention, program code executed certain indicators to measure traffic attributes related to FAN security, privacy and safety in the AMI and DA networks. Non-limiting examples of these indicators are discussed in the paragraphs that follow.

Figure 35:
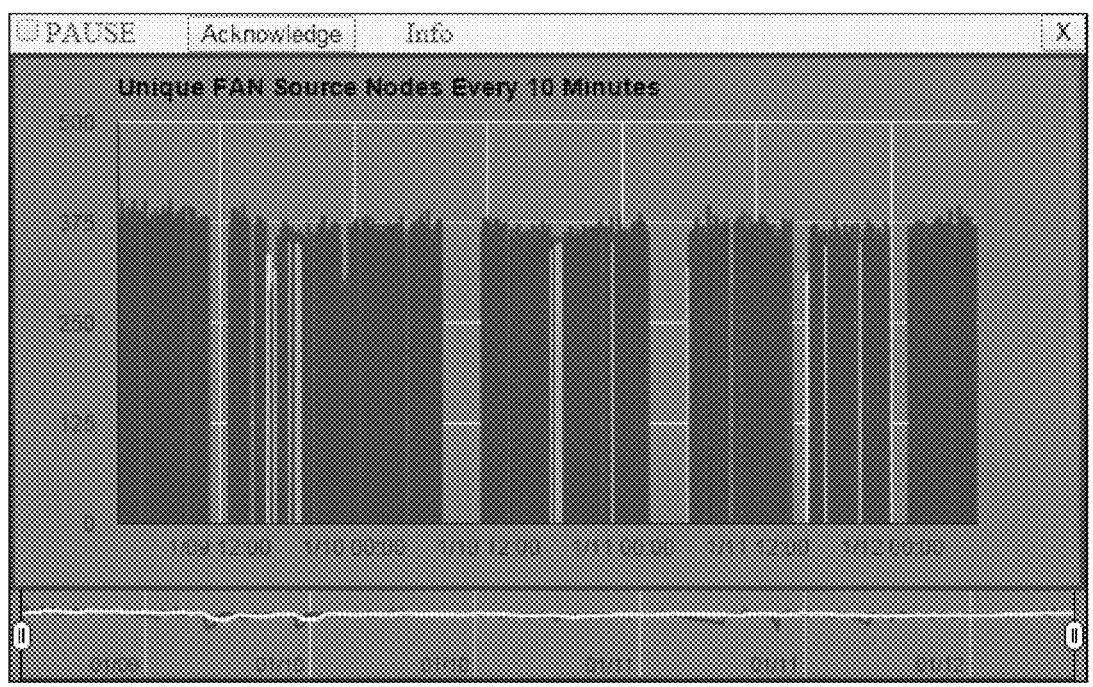

In an embodiment of the present invention, The Unique Source Nodes Indicator tracks the number of unique physical source MAC addresses observed in the AMI and DA networks during the analysis window. Meters may communicate at a fairly constant rate resulting in a unique source node count that remains relatively steady over the analysis window. A decrease in this indicator may imply that a number of nodes have stopped communicating, while an increase may indicate more nodes are communicating than usual. An unusual event, such as a power outage, a system reboot (even staggered) or distributed denial of service attack will cause the Unique Source Nodes Indicator to spike, as many nodes suddenly start communicating over a very short period of time. The effect of scheduled jobs, such as meter reads, is not pronounced in this indicator. FIG. 35 is an example indicator chart for Unique Source Nodes.

Figure 36:
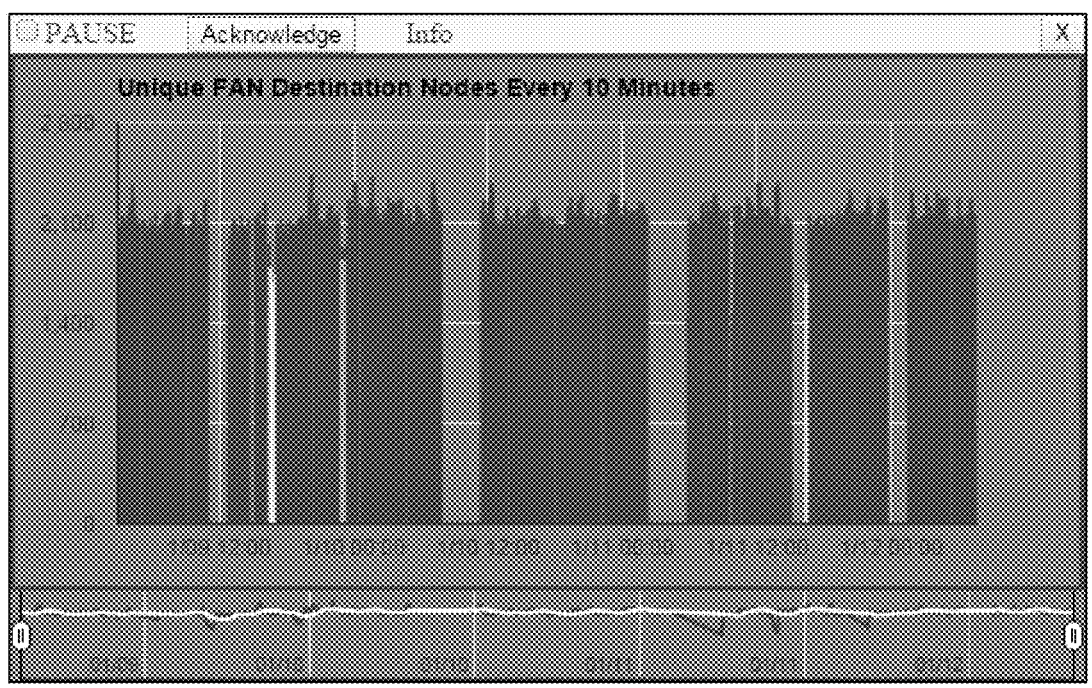

In an embodiment of the present invention the Unique Destination Nodes Indicator tracks the number of unique physical destination MAC addresses observed in the AMI and DA networks during the analysis window. Similar to the Unique Source Nodes Indicator, the Unique Destination Nodes Indicator may remain relatively steady over the analysis window. A sudden increase in the number of unique destination addresses could result from a power outage, a system reboot, or malicious activity to scan an address range. FIG. 36 is an example indicator chart for Unique FAN Destination Nodes.

Figure 37:
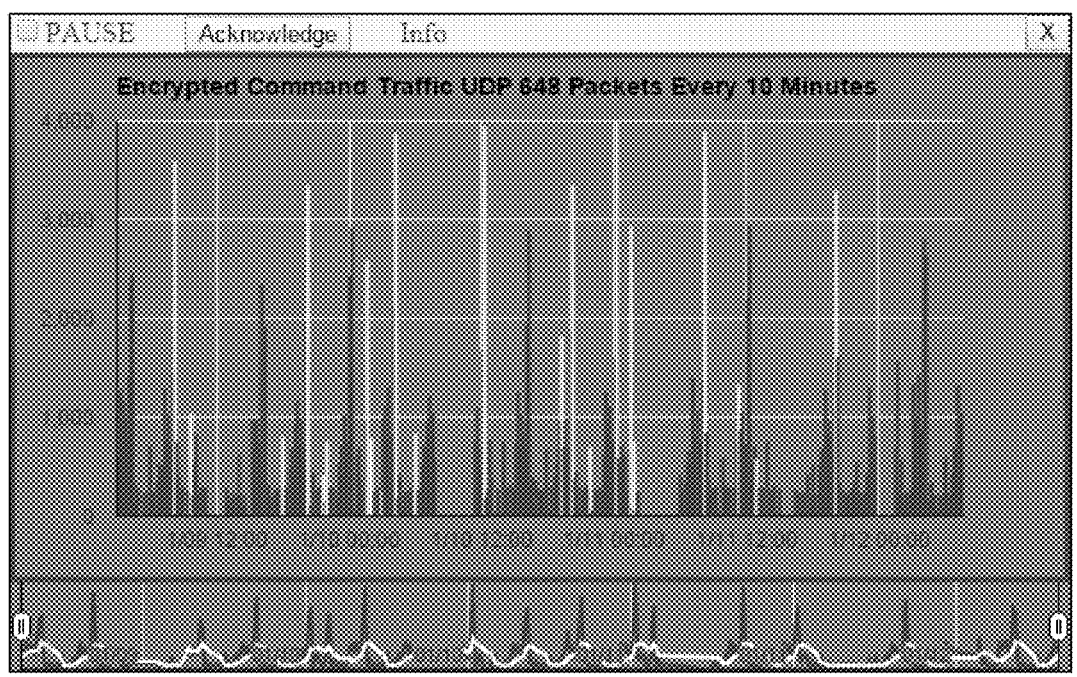

In an embodiment of the present invention, the Encrypted Command Traffic-UDP 648 (Packets) Indicator tracks the number of encrypted IPv6 FAN packets using UDP port 648 observed in the AMI or DA networks during the analysis window. This indicator primarily measures non-null role Management commands to the secure port. In an enhanced security network, the Encrypted Command Traffic-UDP 648 (Packets) Indicator is highly correlated to AMI operations, such as meter reading. A single packet with an encrypted Management command may be counted multiple times if the packet is intercepted by a probe on multiple hops in the FAN. FIG. 37 is an example indicator chart for Encrypted Command Traffic-UDP 648 (Packets). The characteristic peaks of meter reading jobs occurring at 4 hour intervals or six times per day are observed.

Figure 38:
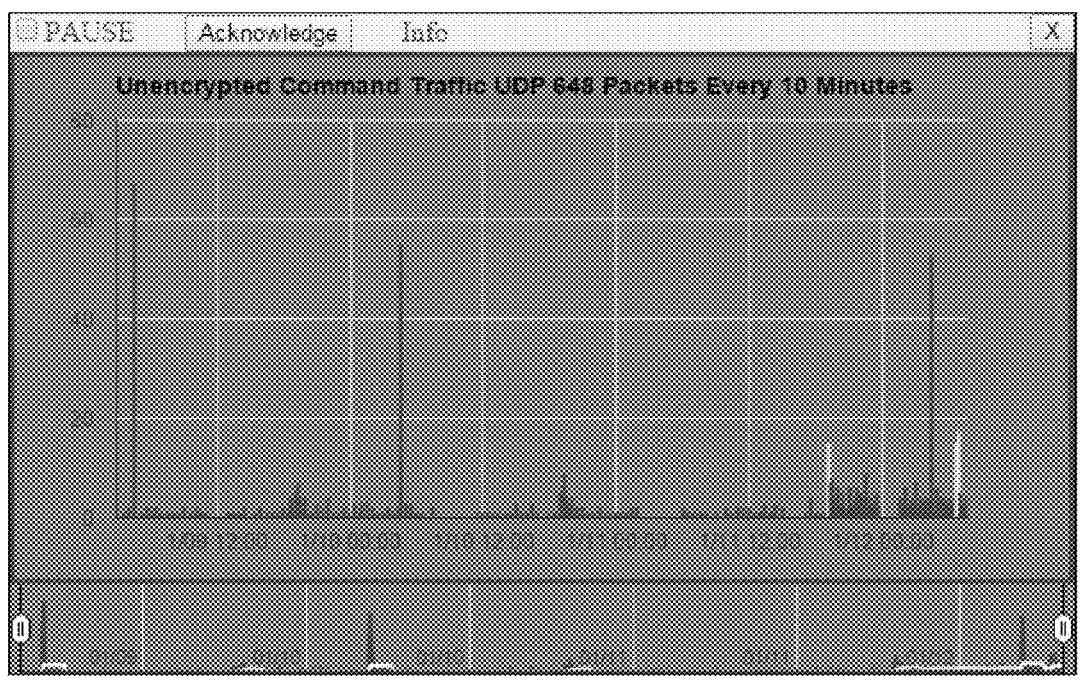

In an embodiment of the present invention, the Unencrypted Command Traffic-UDP 648 (Packets) Indicator tracks the number of unencrypted IPv6 FAN packets using UDP Port 648 observed in the AMI or DA networks during the analysis window. This indicator primarily measures the number of "null role" Management commands sent to the secure port. In an enhanced security network, "null role" commands are used to read information from field nodes. A single packet with an unencrypted Management command may be counted multiple times if the packet is intercepted by a probe on multiple hops in the FAN. FIG. 38 is an example indicator chart for Unencrypted Command Traffic-UDP 648 (Packets).

Figure 39:
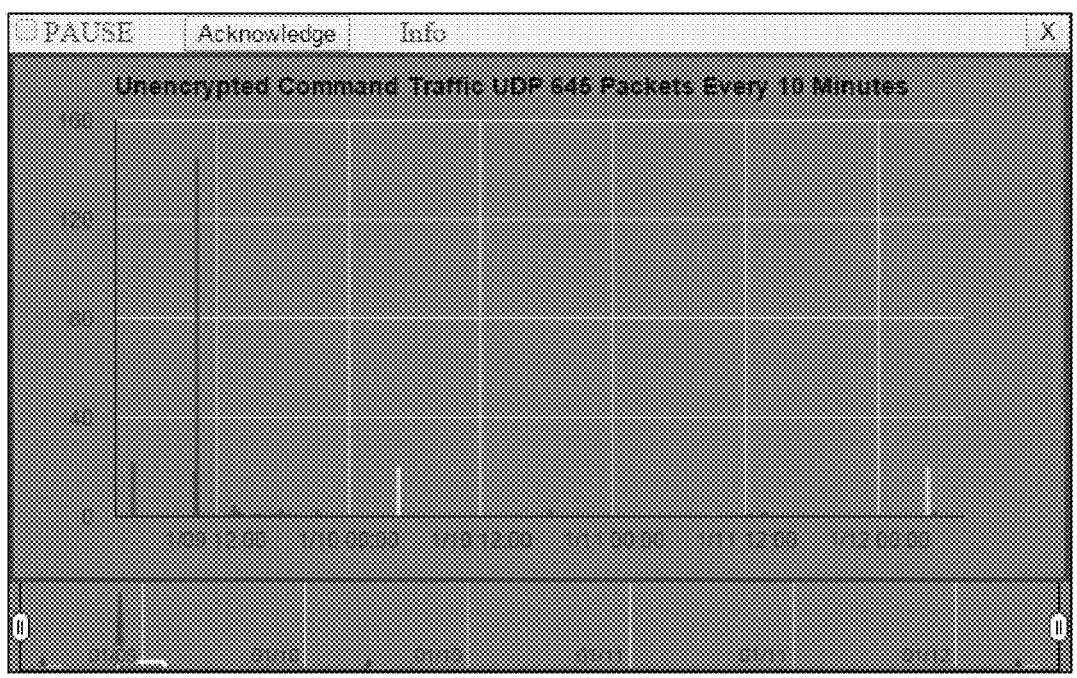
Figure 40:
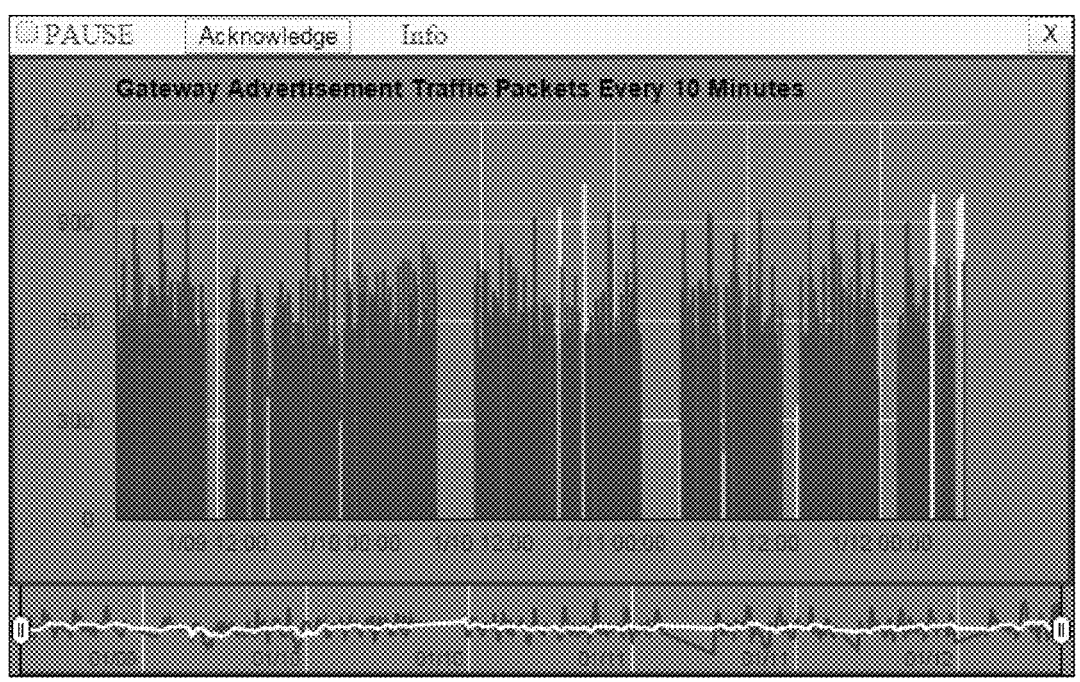

In an embodiment of the present invention, The Unencrypted Command Traffic-UDP 645 (Packets) Indicator tracks the number of unencrypted IPv6 FAN packets using UDP Port 645 observed in the AMI or DA networks during the analysis window. This indicator primarily measures the number of Management commands sent to the insecure port. In a basic security network, the insecure Command Port should rarely be used and activity on this port should be investigated. A single packet with an unencrypted Management command may be counted multiple times if the packet is intercepted by a probe on multiple hops in the FAN. FIG. 39 is an example indicator chart for Unencrypted Command Traffic-UDP 645 (Packets).

In an embodiment of the present invention, the Gateway Advertisement Traffic (Packets) Indicator tracks the number of packets associated with the advertisement of AP and DA master gateways observed in the AMI and DA networks during the analysis window. AP and DA master gateway advertisements may be broadcast or directed. Direct gateway advertisements are sent as unicast traffic to a specific field node. This indicator may reveal the presence of a rogue node attempting to redirect or black hole the FAN traffic. FIG. 39 is an example indicator chart for Gateway Advertisement Traffic (Packets).

Figure 41:
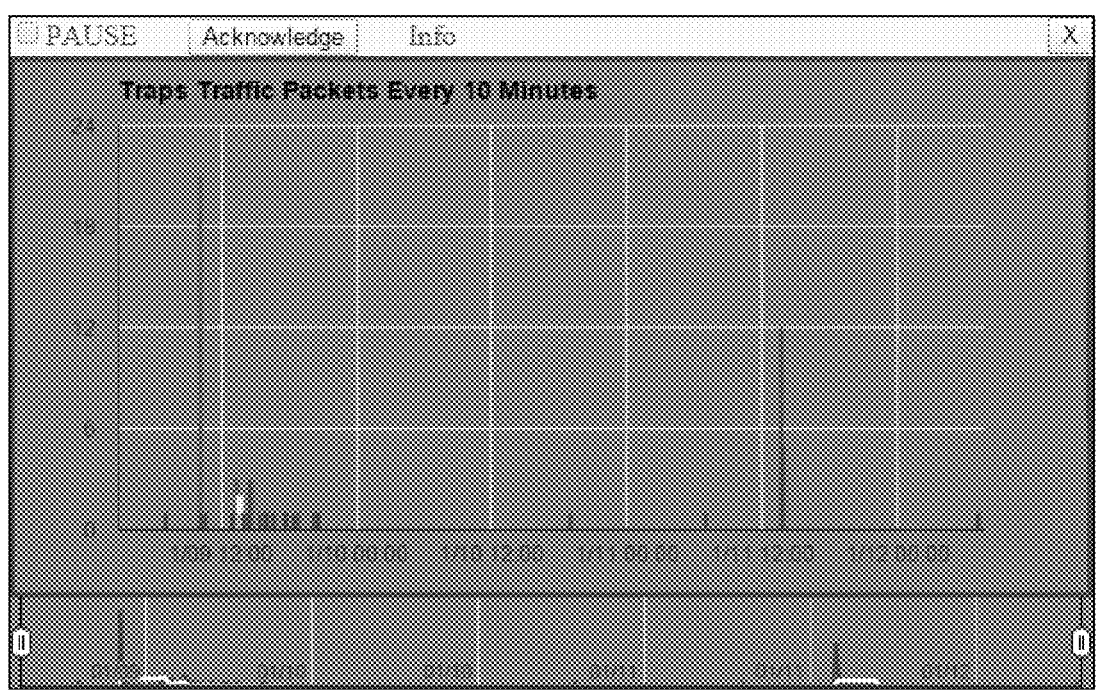

In an embodiment of the present invention, the Trap Traffic (Packets) Indicator tracks the number of IPv6 packets using UDP port (647) observed in the AMI or DA networks during the analysis window. This indicator primarily measures asynchronous traps generated by field devices due to a variety of security, revenue assurance, and safety conditions. Traps are sent to the backend trap server on UDP port 647. Traps may be acknowledged or unacknowledged by the trap server. Trap packets and any acknowledgments are collectively reported by this indicator. A Trap packet may be counted multiple times if the packet is intercepted by a probe on multiple hops in the FAN. FIG. 41 is an example indicator chart for Trap Traffic (Packets).

Figure 42:
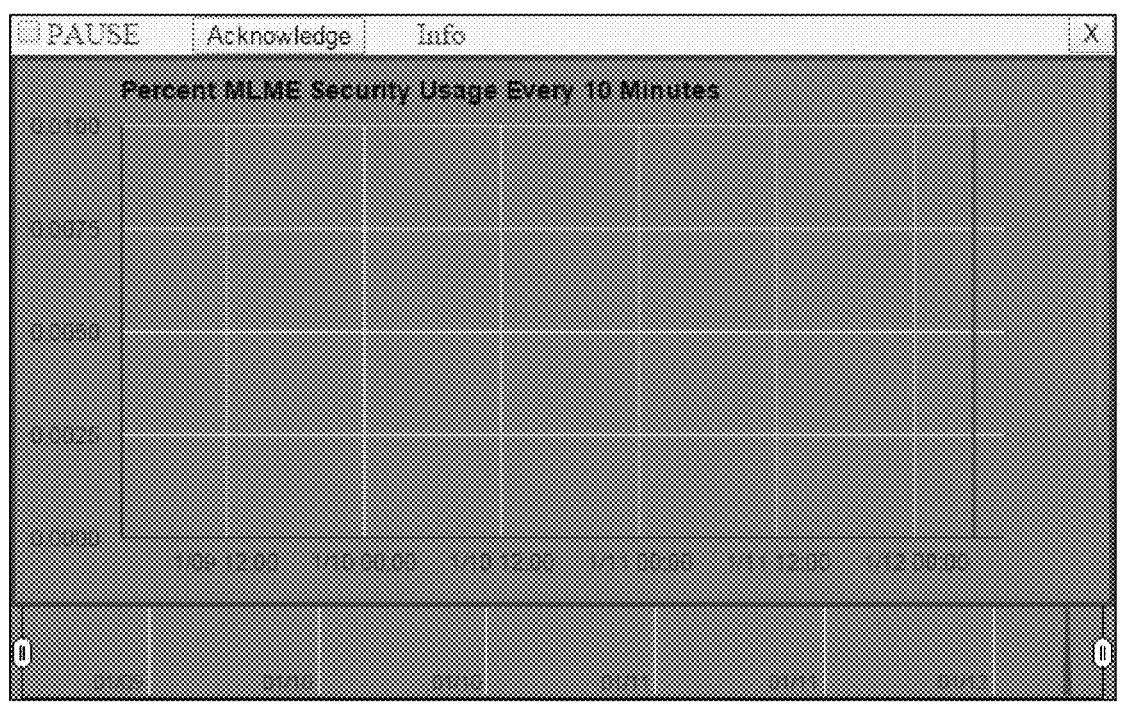

In an embodiment of the present invention, the Percent MLME Security Usage Indicator tracks the percentage of packets that contain a Media Layer Management Entity (MLME) Security Hash TLV observed in the AMI and DA networks during the analysis window. This indicator primarily measures the use of packet security integrity controls via the MLME layer. FIG. 42 is an example indicator chart for Percent MLME Security Usage is shown below.

Figure 43:
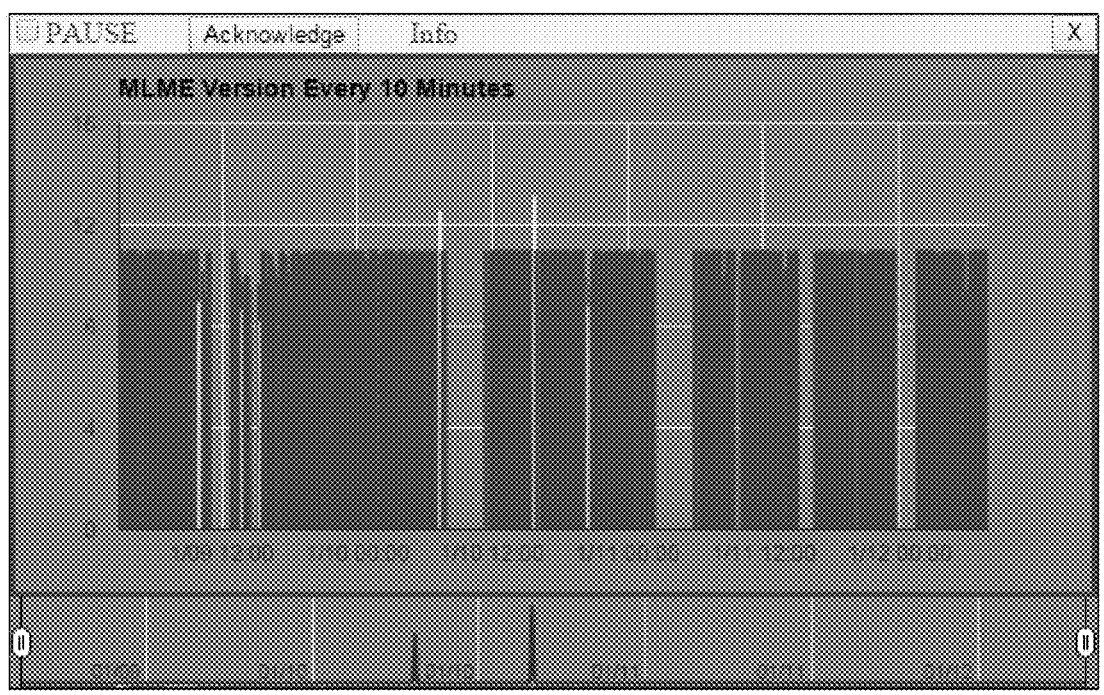

In an embodiment of the present invention, the MLME Version tracks the version of Media Layer Management Entity (MLME) protocol used in FAN communications observed in the AMI and DA networks during the analysis window. This indicator primarily monitors the version number of the software layer associated with security controls. The indicator should be flat if all field nodes in the system are using the same protocol version. FIG. 43 is an example indicator chart for MLME Version.

Figure 44:
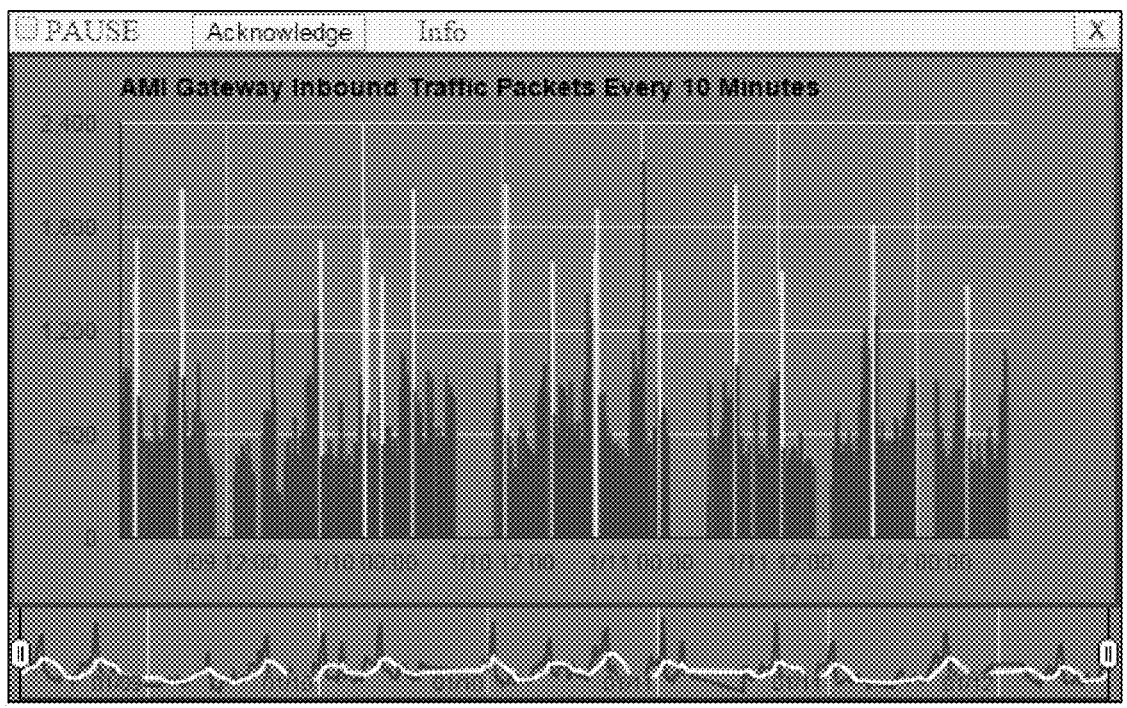

In an embodiment of the present invention, the AMI Gateway Inbound Traffic (Packets) Indicator tracks the number of FAN packets observed during the analysis window whose physical layer destination is the MAC address of a field network gateway (i.e., an AP) in the AMI network. The AMI Gateway Inbound Traffic (Packets) Indicator is responsive to all FAN packets destined to a gateway, and not just embedded IPv6 traffic destined for backend management systems. Because it uses the physical layer MAC address, this indicator is not affected by packets that are relayed over multiple hops. The AMI Gateway Inbound Traffic (Packets) Indicator can be applied to all gateways or a selected subset. It is recommended to apply it to gateways located nearby probes because probe RF coverage will affect the amount of gateway link traffic intercepted. A significant increase in AMI Gateway Inbound Traffic potentially indicates efforts by malicious actors to scan gateways or penetrate backend systems from the wireless mesh. FIG. 44 is an example indicator chart for AMI Gateway Inbound Traffic (Packets) is shown below.

Figure 45:
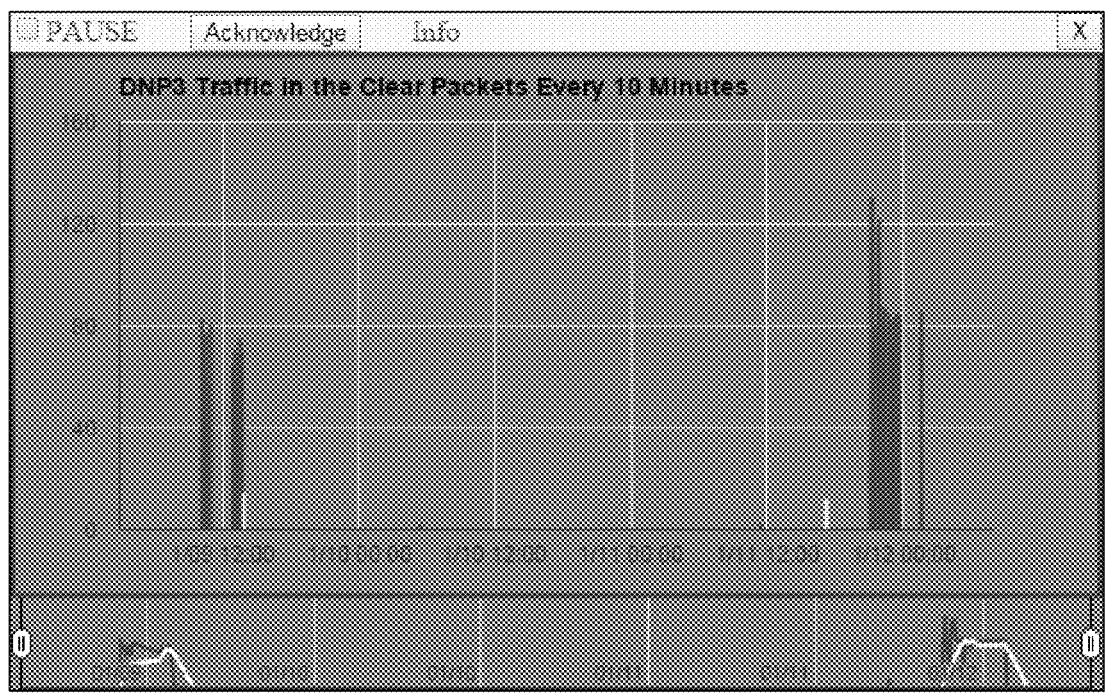

In an embodiment of the present invention, the DNP3 Traffic in the Clear (Packets) Indicator tracks the number of FAN packets containing embedded DNP3 traffic (using TCP source or destination port equal to 20000) transported in the clear in the AMI and DA networks during the analysis window. Ordinarily, DNP3 traffic in our some DA networks is transported through encrypted tunnels. However, a security failure or misconfiguration could result in DNP3 traffic being sent without any protection. No DNP3 traffic is carried by any portion of select AMI network. However, the system architecture permits sharing of certain resources, such as backend gateways. To detect unexpected traffic cross-over, this indicator also monitors for the presence of DNP3 traffic by AMI nodes. Under normal conditions, the DNP3 Traffic in the Clear (Packets) Indicator should show no activity. FIG. 45 is an example indicator chart for DNP3 Traffic in the Clear (Packets).

In an embodiment of the present invention, indicators in a FAN Routing Indicator Group measure traffic attributes related to FAN routing, route maintenance, and node discovery in the AMI and DA networks. Non-limiting examples of these types of indicators are discussed in the paragraphs that follow.

In an embodiment of the present invention, the Network Registration Requests (Packets) Indicator tracks the number of packets that contain a Network Registration Request observed in the AMI and DA networks during the analysis window. Network Registration Requests are sent by Smart Meters and remote DA devices to APs and master DA devices, respectively to associate with an AP or master DA subnet and acquire an IPv6 address, if necessary. Field nodes periodically perform network registration. A large burst of Network Registration Requests indicate that that the mesh has been disturbed and field nodes are trying to reroute. An AP or master DA device failure will also generate a burst of Network Registration Request activity. FIG. 45 is an example indicator chart for Network Registration Requests (Packets).

Figure 46:
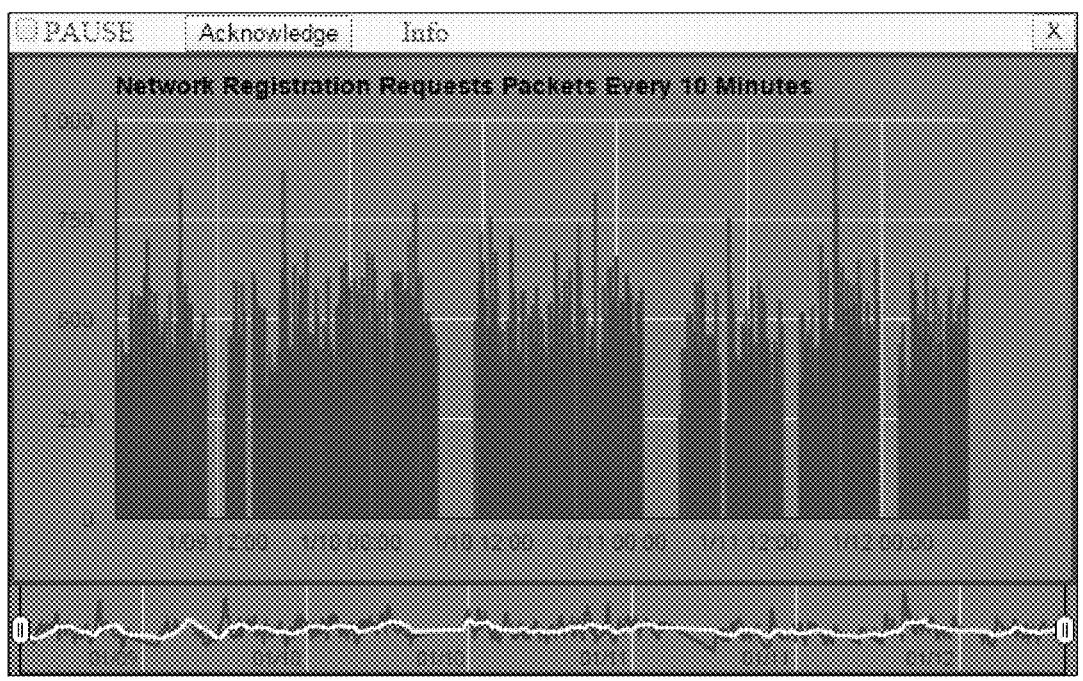

In an embodiment of the present invention, the Network Registration Request/Response Ratio Indicator tracks the ratio Network Registration Request packets to Network Registration Response packets observed in the AMI and DA networks during the analysis window. Network Registration Requests are sent by Smart Meters and remote DA devices to a field network gateway (an AP or master DA device, respectively) to associate with an AP or master DA subnet and acquire an IPv6 address, if necessary. A Network Registration Request or Response may be counted multiple times if intercepted by a probe on multiple hops in the FAN. However, if we assume both Network Registration Requests and Responses are observed equally on multiple hops, the Network Registration Request/Response Ratio should not be affected. The Network Registration Request/Response Ratio is therefore expected to be close to 1 under normal conditions. A field network gateway failure will generate a burst of Network Registration Request activity and cause this indicator to rise significantly. The Network Registration Request/Response Ratio Indicator may be implemented with full band probes to avoid any effect from channel sampling. FIG. 46 below is an example indicator chart for the Network Registration/Response Ratio.

Figure 47:
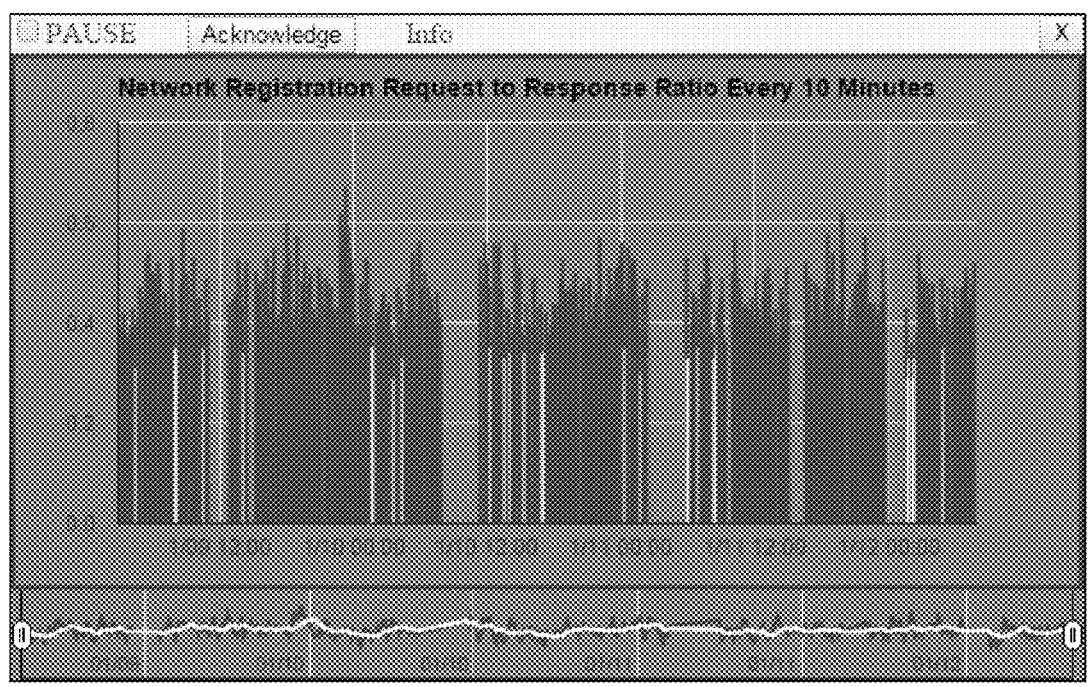

In an embodiment of the present invention, the Average FAN Gateway Path Cost tracks the average path cost to an AP or master DA backend gateway reported in a route advertisement packet by nodes observed in the AMI and DA networks during the analysis window. In a stable mesh FAN, the AP or master DA gateway path cost should remain relatively stable. Significant fluctuations indicate mesh instability or malicious activity such as a routing attack. Node failures will also result in increases in Average FAN Gateway Path Cost. FIG. 47 is an example indicator chart for Average FAN Gateway Path Cost is shown below.

Figure 48:
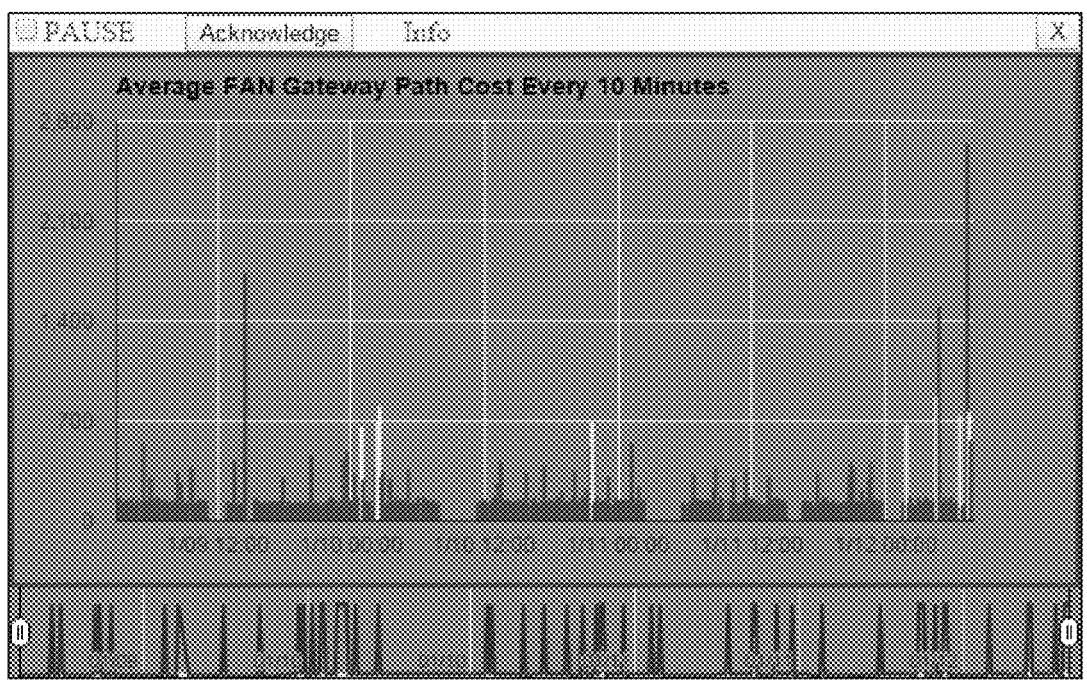

In an embodiment of the present invention, the AMI Average Hop Count (+1) tracks the average number of hops for an AP to send a packet to a field node observed in the AMI network during the analysis window. This indicator tracks the hop count plus one since it uses the address count in source routed packets, which has n+1 addresses for n hops. Smart Grid AMI mesh networks are typically designed with average hop counts between 4 and 8. In a stable mesh FAN, the average hop count should remain relatively stable. An increase in average hop count may indicate an AP failure or the need to re-engineer AP or Relay locations. FIG. 48 is an example indicator chart for AMI Average Hop Count (+1).

Figure 49:
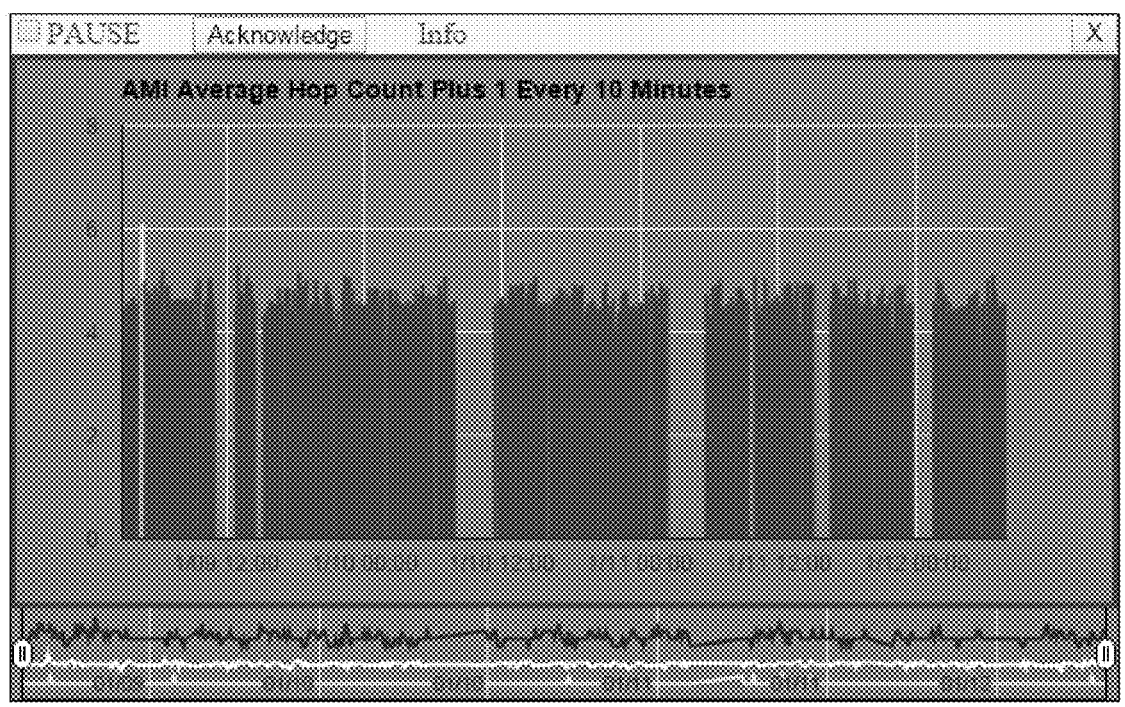

In an embodiment of the present invention, the Routing Traffic (Bytes) Indicator measures the number of bytes associated with routing protocol packets observed in the AMI and DA networks during the analysis window. Routing packets include broadcast and directed advertisements for APs and DA master gateways, network registration requests and network registration responses. FIG. 49 is an example indicator chart for Routing Traffic (Bytes) is shown below.

Figure 50:
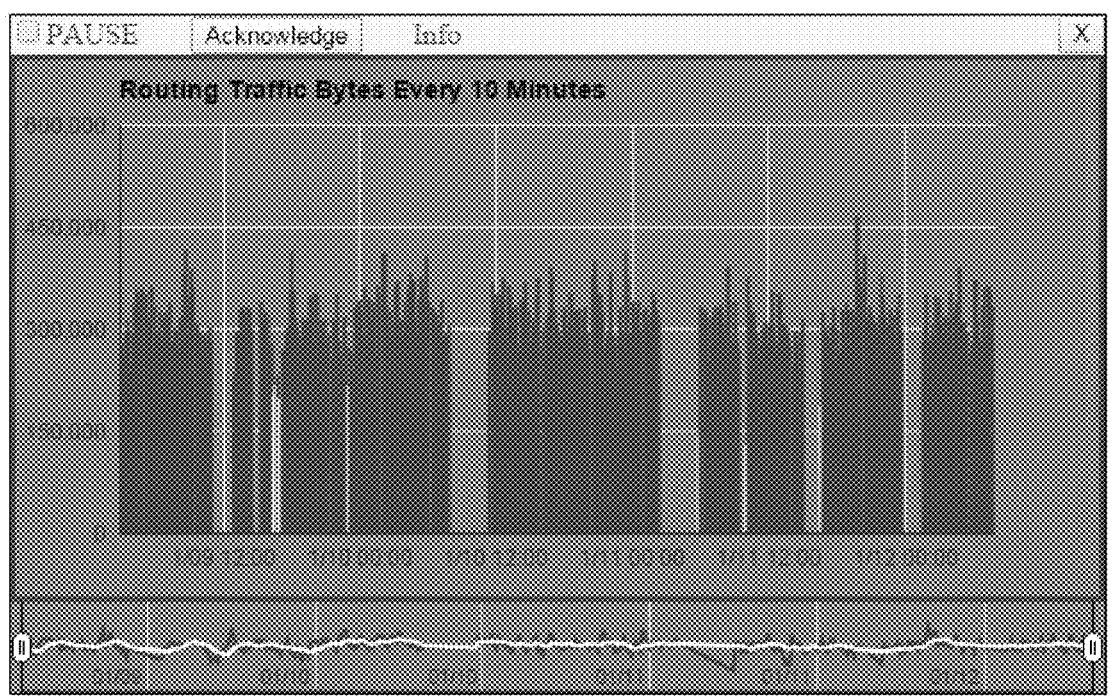

In an embodiment of the present invention, the Node Discovery and Maintenance Traffic Indicator tracks the number of packets associated with node discovery and mesh maintenance observed in the AMI and DA networks during the analysis window. Node discovery packets are used by field nodes to announce their presence in the network and discover neighbors. Mesh maintenance packets are used to maintain synchronization information in frequency hopping networks and ensure node queues are fresh. Node Discovery and Maintenance traffic is relatively constant in a stable FAN. A rise in Node Discovery requests can occur if many nodes are rebooted or one or more nodes are maliciously announcing themselves and attempting to identify neighbor nodes on a frequent basis. FIG. 50 is an example indicator chart for Node Discovery and Maintenance (Packets).

Figure 51:
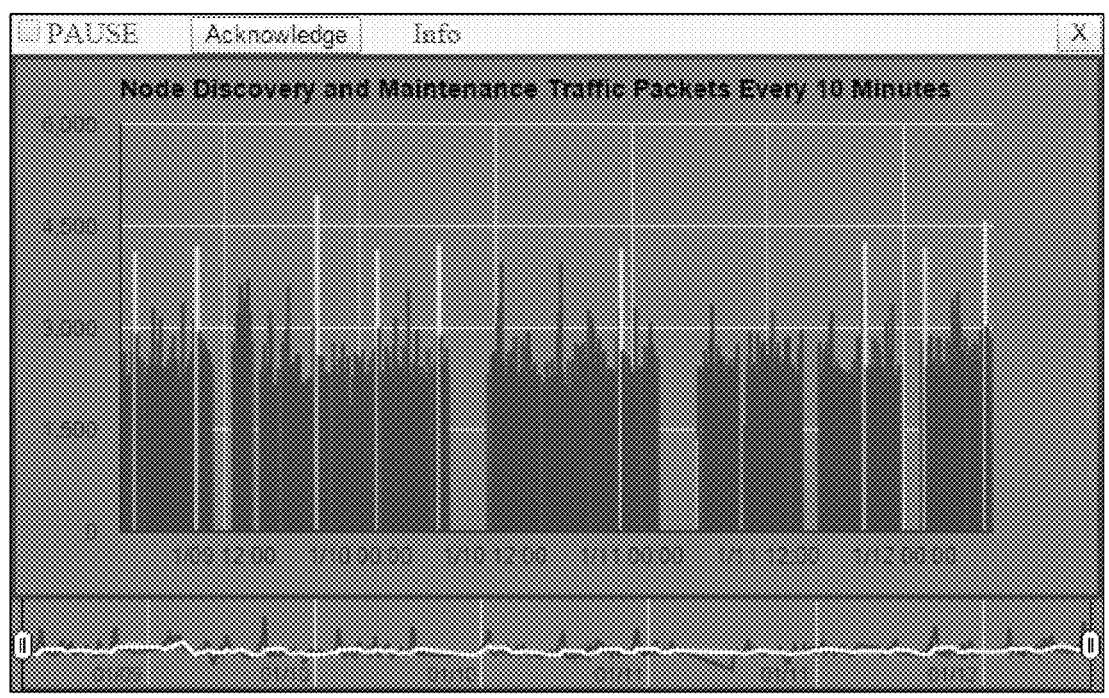
Figure 52:
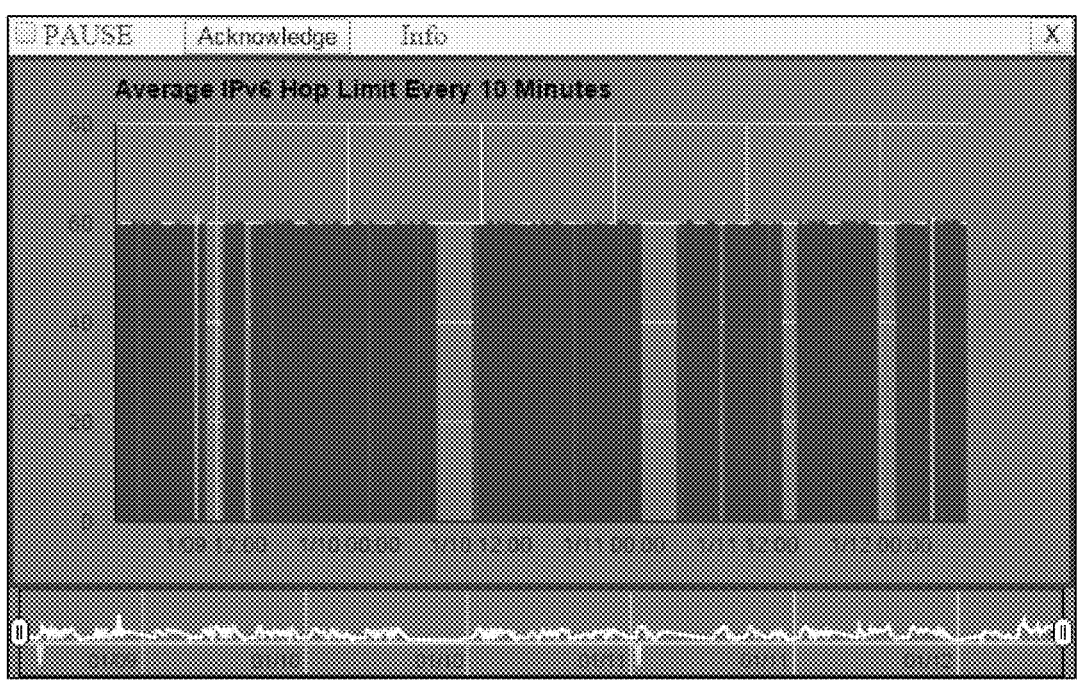

In an embodiment of the present invention, the Average IPv6 Hop Limit Indicator calculates the average hop limit observed in the header of embedded IPv6 FAN packets observed in the AMI and DA networks during the analysis window. The hop limit is the number of network segments on which an IPv6 packet is allowed to travel before being discarded by a router. The Hop Limit is set by the sending host and is used to prevent packets from endlessly circulating on an IPv6 internetwork. When forwarding an IPv6 packet, IPv6 routers are required to decrease the Hop Limit by 1 and discard the IPv6 packet when the Hop Limit is 0. The Average IPv6 Hop Limit is usually quite stable, unless instabilities occur in the IPv6 path between field nodes and backend management systems. A sudden change typically indicates a routing failure, usually in the backend networks. FIG. 51 is an example indicator chart for Average IPv6 Hop Limit.

In an embodiment of the present invention a DA SCADA Indicator Group contains indicators that measure traffic attributes related specifically to the DA SCADA FAN.

In an embodiment of the present invention, the DA SCADA Tunnel Traffic (Packets) Indicator tracks the number of IPsec Encapsulating Security Payload (ESP) and ISAKMP packets associated with encrypted tunnels for DA SCADA traffic during the analysis window. DA SCADA info is carried as embedded IPv4 traffic in FAN packets using IPsec Encapsulating Security Payload (ESP) and ISAKMP. DA SCADA traffic is usually quite regular and consistent. A significant drop in DA SCADA Tunnel Traffic could indicate a sudden network problem or system misconfiguration that is causing DA SCADA traffic to be sent outside encrypted tunnels in the clear. An indicator change could also indicate misbehaving equipment or malicious activity affecting the encrypted tunnels.

In an embodiment of the present invention, the DA Management and DNS Traffic (Packets) Indicator tracks the number of FAN packets containing embedded IPv4 traffic between field nodes and the DA management system, field node DNS traffic and any IPv6 traffic exchanged with DA field nodes during the analysis window.

In an embodiment of the present invention, the DA IPv4 Inbound/Outbound Packet Ratio Indicator tracks the ratio of inbound DA IPv4 FAN packets to outbound DA IPv4 FAN packets during the analysis window. DA traffic includes SCADA traffic between energy control systems and field power components and, to a lesser extent, DA management system traffic.

In an embodiment of the present invention, the Average IPv4 Hop Limit Indicator calculates the average hop limit (Time To Live) observed in the header of embedded IPv4 FAN packets observed in both the AMI and DA networks during the analysis window. The Average IPv4 Hop Limit Indicator is mainly associated with DA SCADA traffic, which is primarily IPv4 between SCADA energy control systems and field power components. The Hop Limit is the number of network segments on which an IPv4 packet is allowed to travel before being discarded by a router. The Hop Limit is set by the sending host and is used to prevent packets from endlessly circulating on an IPv4 internetwork. When forwarding an IPv4 packet, IPv4 routers are required to decrease the Hop Limit by 1 and discard the IPv4 packet when the Hop Limit is 0. The Average IPv4 Hop Limit is usually quite stable, unless instabilities occur in the IPv4 path between field nodes and backend systems. A sudden change typically indicates a routing failure, usually in the backend networks.

In an embodiment of the present invention, indicators in Smart Grid Service Indicator Group measure traffic attributes related to Smart Grid services, such as meter reading, Home Area Network messages, direct load control, and firmware updates.

In an embodiment of the present invention, the Firmware Update Traffic (Packets) Indicator tracks the number of FAN packets associated with the transfer of field node firmware observed in the AMI and DA networks during the analysis window. This indicator monitors the seeding of firmware from the backend management systems into select nodes and the peer-to-peer transfer of firmware between field nodes via a request and response process for image blocks. Transfer of firmware may occur using a dedicated UDP port or at lower FAN protocol layers. The Firmware Update Traffic (Packets) Indicator helps track the progress of firmware update in the mesh when new field node firmware is released. It can help select better seed meters to start the update process. From a security perspective, it may indicate unauthorized firmware update activity spreading through the mesh. When no firmware updates are scheduled, the Firmware Update Traffic (Packets) Indicator should show little to no traffic activity. A small degree of activity may be present due to the deployment of new field nodes, such as meters, during normal utility operations.

In an embodiment of the present invention, the Meter Read Traffic (Packets) Indicator tracks the number of FAN packets associated with meter reading activity observed in the AMI network during the analysis window. It monitors the embedded IPv6 packets whose source or destination is a backend system that reads meters. Since meter read transactions are usually encrypted, content with the packets is not used as criteria for this indicator. In cases where the backend server performing meter reads also supports other functions, additional criteria is necessary to distinguish meter read traffic from other activity, such as HAN traffic. Meter read traffic is very periodic as meter read jobs typically occur 6 times a day on 4 hour intervals.

In an embodiment of the present invention, the HAN Messaging Traffic (Packets) Indicator tracks the number of FAN packets associated with Home Area Network (HAN) communication between backend management systems and meters observed in the AMI network during the analysis window. Specifically, it monitors the embedded IPv6 packets whose source or destination is a backend system that send HAN messages such as price signals and bill forecasts to in-home devices through Smart Meter. Since HAN transactions are usually encrypted, content with the packets is not used as criteria for this indicator. In cases where the backend server performing HAN messaging also supports other functions, additional criteria is necessary to distinguish HAN traffic from other activity, such as meter reading. The pattern of HAN traffic depends heavily upon the services provided by the utility.

In an embodiment of the present invention, the Direct Load Control Traffic (Packets) Indicator tracks the number of FAN packets associated with Direct Load Control (DLC) communication between backend management systems and field devices, such as air conditioning compressors and hot water heaters observed in the AMI and DA networks during the analysis window. Specifically, it monitors the embedded IPv6 packets whose source or destination is a backend system that sends DLC commands. Since DLC transactions are usually encrypted, content with the packets is not used as criteria for this indicator. In cases where the backend server performing DLC also supports other functions, additional criteria is necessary to distinguish DLC traffic from other activity, such as HAN messaging. DLC traffic may vary substantially on a daily basis.

In an embodiment of the present invention, the Gas and Water Meter Read Traffic (Packets) Indicator tracks the number of FAN packets associated with gas and water meter reading activity observed in the AMI network during the analysis window. The operation of gas and water meter reading is system dependent. In some AMI networks, gas and water Integrated Measurement Units (IMU) autonomously and periodically wake up and transmit register information to constantly powered devices, such as Smart Meters or Access Points. This indicator tracks packets associated with the transfer of register data from IMUs to constantly powered devices. Electric meters typically pass IMU readings during electricity usage reads. In some embodiments of the present invention, those packets are not counted by the Gas and Water Meter Read Traffic (Packets) Indicator.

In an embodiment of the present invention, indicators in a Network Service Indicator Group measure traffic attributes related to network services, such as Domain Name Service (DNS) and Network Time, used by field nodes in the AMI and DA networks.

In an embodiment of the present invention, the DNS Update Traffic (Packets) Indicator tracks the number of FAN packets containing embedded IPv4 or IPv6 DNS traffic with the Dynamic Update Opcode (5) observed in the AMI and DA networks during the analysis window. DNS Update traffic includes both packets to update DNS records (known as queries) and responses from the DNS server (responses). DNS Update traffic is normally predictable and relatively flat. It is a strong indicator of network health. Sudden spikes in DNS traffic indicate reorganization of nodes in the mesh, which can be the result of node failures, malicious traffic, and sudden changes in the RF environment. A DNS packet may be counted multiple times if the packet is intercepted by a probe on multiple hops in the FAN.

In an embodiment of the present invention, the DNS Update Request/Response Packet Ratio Indicator tracks the ratio of IPv4/IPv6 DNS Update Request packets to DNS Response Packets observed in the AMI and DA networks during the analysis window. Specifically, the DNS Update Request/Response Packet Ratio Indicator tracks the ratio of packets to update DNS records (known as queries) to responses from the DNS server (responses), both with Dynamic Update Opcode (5). The DNS Update Request/Response Packet Ratio is normally flat, but greater than 1. In one example, a ratio greater than 1 indicates that DNS update attempts from field nodes are generally successful reaching the DNS server on the first attempt. This may occur because 1) Packet collisions in the frequency hopping space, 2) Radio conditions that cause packet errors, 3) Next hop routing that is out of date, and 4) node failure. Sudden spikes in the DNS Update Request/Response Packet Ratio typically indicate a gateway or backhaul connectivity failure, which may be temporary in nature. The DNS Update Request/Response Packet Ratio Indicator is also helpful in diagnosing unidirectional network failures, which have occurred with commercial backhaul services.

In an embodiment of the present invention, the DNS Transaction Latency Range (Seconds) Indicator measures the difference in intercept timestamp between a pair of DNS Response and DNS Request (query) packets with the same DNS transaction ID for IPv4/IPv6 DNS transactions observed in the AMI and DA networks during a short (10 minute) analysis window. The DNS Transaction Latency Range (Seconds) Indicator is not limited to DNS update traffic with Dynamic Update Opcode (5), but includes all DNS transactions supported by the IETF RFC. However, DNS records updates are the primary use of DNS services in AMI and DA FANs.

In an embodiment of the present invention, the Hourly DNS Transaction Latency Range (Seconds) Indicator measures the difference in intercept timestamp between a pair of DNS Response and DNS Request (query) packets with the same DNS transaction ID for IPv4/IPv6 DNS transactions observed in the AMI and DA networks during a long (1 hour) analysis window. It is similar to the DNS Transaction Latency Range (Seconds) indicator, but with a longer analysis window. The Hourly DNS Transaction Latency Range (Seconds) Indicator is not limited to DNS update traffic with Dynamic Update Opcode (5), but includes all DNS transactions supported by the IETF RFC.

In an embodiment of the present invention, indicators in a FAN Performance Indicator Group measure traffic attributes related to field network and system performance, such as meter reading and management command transaction latency in the AMI and DA networks.

In an embodiment of the present invention, the Unencrypted Command Latency Range-UDP 645 (Seconds) Indicator measures the difference in intercept timestamp between a pair of unencrypted command packets with the same Sequence Number on UDP Port 645 of a field node for Management transactions observed in the AMI and DA networks during the analysis window. This indicator primarily measures the latency of a field node to respond to a Management command on the insecure port. The Unencrypted Command Latency Range-UDP 645 (Seconds) Indicator chart is a candlestick display showing the range of latencies and average latency (a small dot on each bar) for Management commands on UDP Port 645.

In an embodiment of the present invention, the Command Latency Range-UDP 648 (Seconds) Indicator measures the difference in intercept timestamp between a pair of command packets with the same Sequence Number on UDP Port 648 of a field node for Management transactions observed in the AMI and DA networks during a short (10 minute) analysis window. This indicator primarily measures the latency of a field node to respond to a Management command on the secure port. It may include both encrypted commands and unencrypted commands (null role)

In an embodiment of the present invention, the Hourly Command Latency Range-UDP 648 (Seconds) Indicator measures the difference in intercept timestamp between a pair of command packets with the same Sequence Number on UDP Port 648 of a field node for Management transactions observed in the AMI and DA networks during a long (1 hour) analysis window. This indicator primarily measures the latency of a field node to respond to a Management command on the secure port. It includes both encrypted commands and unencrypted commands (null role), but generally will be dominated by encrypted commands. It is similar to the Command Latency Range-UDP 648 (Seconds) indicator, but with a longer analysis window.

Stream and indicator processing can be intensive depending on the volume of traffic, the complexity of the protocols in the stream, and the complexity of the indicator set. To enable parallel processing, indicators can be divided into groups, where each group is serviced by a separate processor that can run on a different processor. In embodiments of the present invention, each group process may have its own copy of the output stream. Returning to FIG. 2, the multiples streams pictured may represent the separate copies of the output stream. The indicator processing software can also be a multi-threaded application where each indicator is spawned as a separate process. To further improve performance and prevent the indicators from falling behind realtime, custom dissectors that only expose fields used by a particular indicator group could be used to create a simplified output stream for each indicator group at the expense of more process management.

Figure 4:
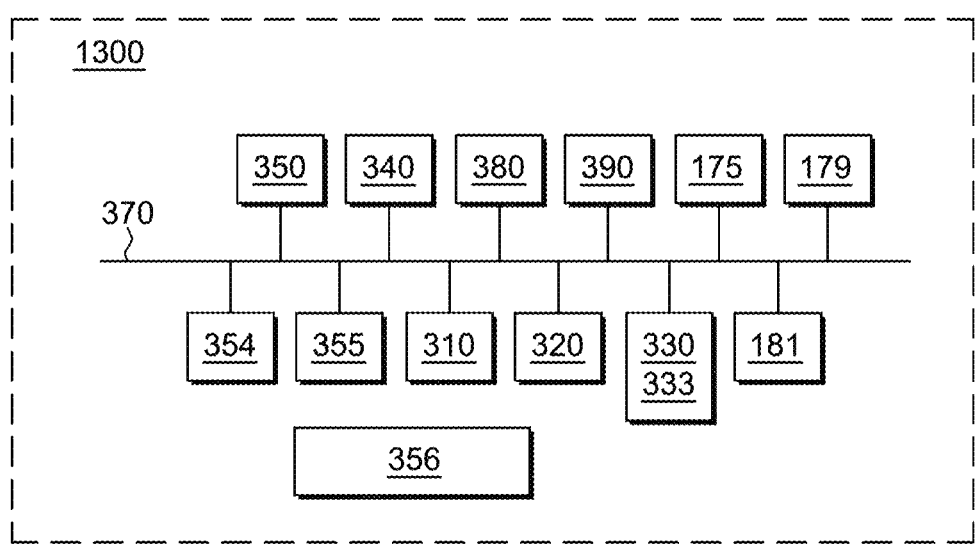
FIG. 4 depicts one embodiment of a single processor computing environment to incorporate and use one or more aspects of the present invention.

As aforementioned, computer resources as utilized in the technical environments described. To this end, FIG. 4 illustrates a block diagram of a resource 1300 in computer system 110 and/or terminal 120a-120b in FIG. 1, or a resource in second network 160, backend management system 140, or traffic profiler 170, in FIGS. 2-3, which is part of the technical architecture of certain embodiments of the technique. The resource 1300 may include a circuitry 370 that may in certain embodiments include a microprocessor 354. The computer system 1300 may also include a memory 355 (e.g., a volatile memory device), and storage 181. The storage 181 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 355 may comprise an internal storage device, an attached storage device and/or a network accessible storage device. The system 1300 may include a program logic 330 including code 333 that may be loaded into the memory 355 and executed by the microprocessor 356 or circuitry 370.

In certain embodiments, the program logic 330 including code 333 may be stored in the storage 181, or memory 355. In certain other embodiments, the program logic 333 may be implemented in the circuitry 370. Therefore, while FIG. 4 shows the program logic 333 separately from the other elements, the program logic 333 may be implemented in the memory 355 and/or the circuitry 370.

Using the processing resources of a resource 1300 to execute software, computer-readable code or instructions, does not limit where this code is can be stored.

Figure 5:
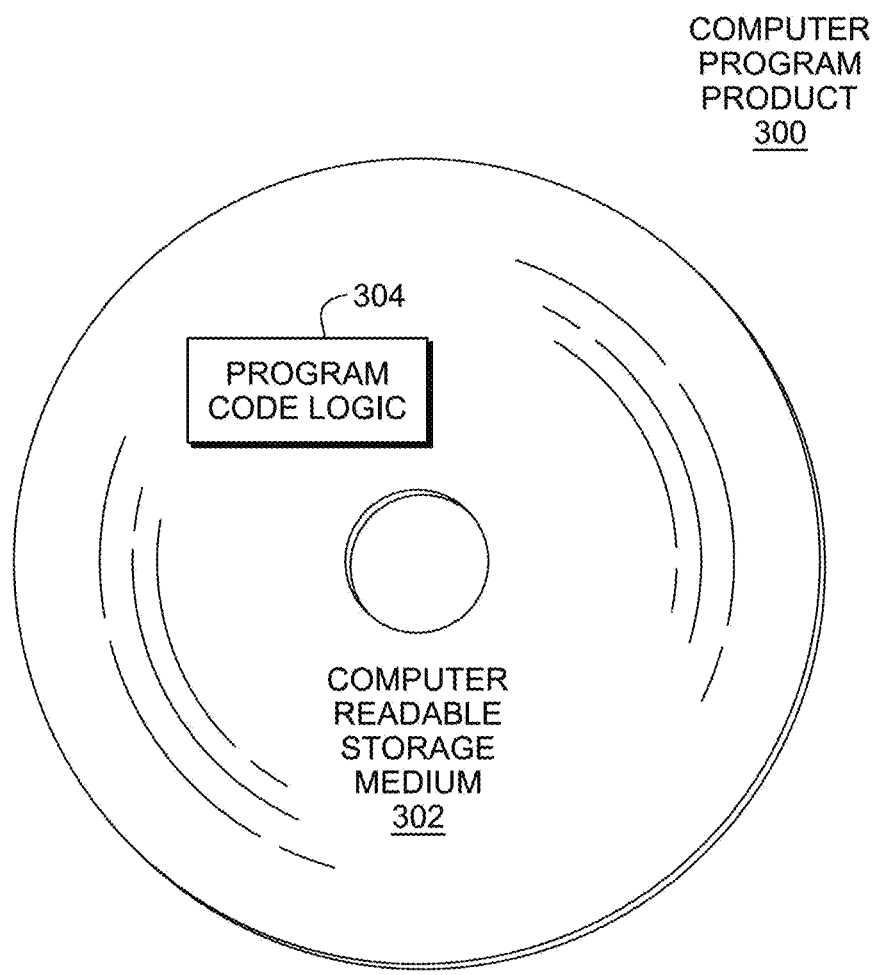
FIG. 5 depicts one embodiment of a computer program product incorporating one or more aspects of the present invention.

Referring to FIG. 5 in one example, a computer program product 300 includes, for instance, one or more non-transitory computer readable storage media 302 to store computer readable program code means or logic 304 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique. As a further aspect of the technique, the system can operate in a peer to peer mode where certain system resources, including but not limited to, one or more databases, is/are shared, but the program code executable by one or more processors is loaded locally on each computer (workstation).

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of performing traffic analysis on a network, comprising:
   obtaining, by a processor, on a backhaul network, time stamped packets and related metadata from an intercepted stream of real-time traffic,
     wherein the intercepted stream was intercepted by a probe by passively listening on channels in the network,
     wherein the intercepted stream contains one of: distinct traffic or overlapping traffic, and
     wherein the time stamped packets were time stamped at interception,
   pre-processing, by the processor, the intercepted stream, wherein the pre-processing comprises separating a portion of the intercepted stream into dissected fields;
   creating, by the processor, indicators of a plurality of indicator types by selecting an analysis operator to apply to one or more of the dissected fields in a logical expression, wherein at least one of the indicators is of an indicator type selected from the group consisting of: network health, security, revenue protection, privacy, and configuration validation;
   analyzing the dissected fields in the output streams utilizing the indicators, wherein the analyzing comprises:
     based on the indicators, separating the dissected fields into multiple streams by indicator type;
     processing each of the multiple streams in parallel by a separate processing entity of the processor; and
     recombining, by the processor, the multiple streams by utilizing timestamps on the time stamped packets to reconcile delays and maintain an order of the indicators;

obtaining, by the processor, results from the indicators;
registering, by the processor, metadata describing the results in a database server in a data structure;
receiving, by the processor, at the database server, via an integrated web server, over the backhaul network, a request to produce a dynamic visual representation of the results; and
generating, by the processor, based on the request, via the backhaul network, a dynamic dashboard of the results.

2. The method of claim 1, wherein the network is a Smart Energy field area network for at least one of: Advanced Metering Infrastructure, Distribution Automation, Protective Switching or Supervisory Control and Data Acquisition.

3. The method of claim 1, wherein the network is at least one of: a wireless network, a mesh-based network, or a wireless mesh network.

4. The method of claim 1, further comprising:
utilizing timestamps on the time stamped packets to reconcile delays in packet data to report indicators based on when the time stamped packets were intercepted.

5. The method of claim 1, wherein the analyzing is performed by multiple servers.

6. The method of claim 1, further comprising:
configuring the dynamic dashboard based on an attribute of the client, wherein the attribute comprises a preferred display order for the indicators.

7. The method of claim 1, wherein the indicators are obtained from a configuration file which can be edited directly by the user through a graphical interface.

8. The method of claim 1, further comprising:
retaining the timestamps associated with the time stamped packets on a memory resource; and
based on the timestamps, simulating network traffic in the network for a predetermined period of time to generate indicators for the predetermined period, wherein the indicators indicate at least one of: network health, network security, or network privacy.

9. The method of claim 1, wherein the analyzing comprises:
determining if a given event is present, wherein the given event indicates a state change in the network or an anomaly in of the network; and
based on the determining, reporting the state change or the anomaly based on presence of the given event.

10. The method of claim 9, wherein the reporting comprises at least one of: information regarding statistical analysis or status information.

11. The method of claim 1, wherein at least one indicator of the indicators is preconfigured to operate automatically as an independent timescale for responsiveness to changes in traffic patterns.

12. The method of claim 1, further comprising:
retaining, by the processor on a memory resource, historical values for an indicator; and
based on receiving a request from a client, defining a period of time in the past to utilize the indicator in the analyzing.

13. The method of claim 1, wherein the analyzing comprises:
obtaining, by the processor, a preconfigured threshold indicating an event threshold for a given combined output stream over a predetermined amount of time; and
determining if events are present in the output stream, wherein each event indicates a state change in the network or an anomaly in the network; and
based on determining that a quantity of events present in the output stream meet the preconfigured threshold, reporting state changes or anomalies related to the events.

14. The method of claim 1, wherein the operators perform one of: counting packets or bytes in the output stream satisfying a field expression over an analysis window, tallying a count of unique values in the output stream resulting from the field expression over the analysis window, calculating an average value of the field expression in the output stream over the analysis window, calculating a percentage of packets in the output stream that satisfy the field expression over the analysis window, calculating a ratio of packets in the output stream satisfying the first field expression to a second field expression, or calculating a time latency between two packets in the output stream linked by a common ID or sequence number.

15. A computer system of performing traffic analysis on a network, the computer system comprising:
a memory; and
a processor in communications with the memory, wherein the computer system is configured to perform a method, the method comprising:
obtaining, by a processor, on a backhaul network, time stamped packets and related metadata from an intercepted stream of real-time traffic,
wherein the intercepted stream was intercepted by a probe by passively listening on channels in the network,
wherein the intercepted stream contains one of: distinct traffic or overlapping traffic, and
wherein the time stamped packets were time stamped at interception,
pre-processing, by the processor, the intercepted stream, wherein the pre-processing comprises separating a portion of the intercepted stream into dissected fields;
creating, by the processor, indicators of a plurality of indicator types by selecting an analysis operator to apply to one or more of the dissected fields in a logical expression, wherein at least one of the indicators is of an indicator type selected from the group consisting of: network health, security, revenue protection, privacy, and configuration validation;
analyzing the dissected fields in the output streams utilizing the indicators, wherein the analyzing comprises:
based on the indicators, separating the dissected fields into multiple streams by indicator type;
processing each of the multiple streams in parallel by a separate processing entity of the processor; and
recombining, by the processor, the multiple streams by utilizing timestamps on the time stamped packets to reconcile delays and maintain an order of the indicators;
obtaining, by the processor, results from the indicators;
registering, by the processor, metadata describing the results in a database server in a data structure;
receiving, by the processor, at the database server, via an integrated web server, over the backhaul network, a request to produce a dynamic visual representation of the results; and
generating, by the processor, based on the request, via the backhaul network, a dynamic dashboard of the results.

16. The computer system of claim 15, wherein the network is a Smart Energy field area network for at least one of: Advanced Metering Infrastructure, Distribution Automation, Protective Switching or Supervisory Control and Data Acquisition.

17. The computer system of claim 15, wherein the network is at least one of: a wireless network, a mesh-based network, or a wireless mesh network.

18. A computer program product for performing traffic analysis on a network, the computer program product comprising:
- a non-transitory computer readable storage medium readable by a processing circuit and storing instructions for execution by the processing circuit for performing a method comprising:
  - obtaining, by a processor, on a backhaul network, time stamped packets and related metadata from an intercepted stream of real-time traffic,
    - wherein the intercepted stream was intercepted by a probe by passively listening on channels in the network,
    - wherein the intercepted stream contains one of: distinct traffic or overlapping traffic, and
    - wherein the time stamped packets were time stamped at interception,
  - pre-processing, by the processor, the intercepted stream, wherein the pre-processing comprises separating a portion of the intercepted stream into dissected fields;
  - creating, by the processor, indicators of a plurality of indicator types by selecting an analysis operator to apply to one or more of the dissected fields in a logical expression, wherein at least one of the indicators is of an indicator type selected from the group consisting of: network health, security, revenue protection, privacy, and configuration validation;
  - analyzing the dissected fields in the output streams utilizing the indicators, wherein the analyzing comprises:
    - based on the indicators, separating the dissected fields into multiple streams by indicator type;
    - processing each of the multiple streams in parallel by a separate processing entity of the processor; and
    - recombining, by the processor, the multiple streams by utilizing timestamps on the time stamped packets to reconcile delays and maintain an order of the indicators;
  - obtaining, by the processor, results from the indicators;
  - registering, by the processor, metadata describing the results in a database server in a data structure;
  - receiving, by the processor, at the database server, via an integrated web server, over the backhaul network, a request to produce a dynamic visual representation of the results; and
  - generating, by the processor, based on the request, via the backhaul network, a dynamic dashboard of the results.

* * * * *